United States Patent
Yamaji et al.

(10) Patent No.: US 7,171,572 B2
(45) Date of Patent: Jan. 30, 2007

(54) INFORMATION PROCESSING APPARATUS, INFORMATION PROCESSING METHOD, AND PROGRAM

(75) Inventors: Hidenori Yamaji, Tokyo (JP); Masami Hosaka, Nagano (JP); Akihiro Miyano, Tokyo (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 10/750,816

(22) Filed: Jan. 5, 2004

(65) Prior Publication Data

US 2005/0022043 A1   Jan. 27, 2005

(30) Foreign Application Priority Data

Jan. 8, 2003   (JP) ............................. 2003-001721

(51) Int. Cl.
   G06F 1/30   (2006.01)
   G06F 1/32   (2006.01)
(52) U.S. Cl. ...................................... 713/320; 713/340
(58) Field of Classification Search ................ 713/300, 713/320, 322, 323, 330, 340
   See application file for complete search history.

(56) References Cited

U.S. PATENT DOCUMENTS

2003/0120960 A1 *   6/2003   Cooper ....................... 713/320
2003/0226043 A1 *  12/2003   Hicok ......................... 713/300
2004/0044914 A1 *   3/2004   Gedeon ....................... 713/300
2005/0102544 A1 *   5/2005   Brewer et al. ............... 713/320

* cited by examiner

Primary Examiner—Dennis M. Butler
(74) Attorney, Agent, or Firm—Oblon, Spivak, McClelland, Maier & Neustadt, P.C.

(57) ABSTRACT

An information processing apparatus having a processor is disclosed. The apparatus includes power monitoring means for monitoring power consumed by the information processing apparatus. The power monitoring means further outputs a power limit request demanding a limit to the power when the power being monitored exceeds a predetermined threshold. The apparatus also includes first setting means for setting a first control for limiting an availability factor of the processor as a limit to the power when the power monitoring means outputs the power limit request; second setting means for setting a second control for limiting the availability factor of the processor as a limit to the power when the power monitoring means outputs the power limit request; first controlling means for executing the first control set by the first setting means; and second controlling means for executing the second control set by the second setting means.

17 Claims, 19 Drawing Sheets

F I G. 4

| CONTROL NAME | PRELIMINARY POWER LIMIT CONTROL | POWER LIMIT CONTROL |
|---|---|---|
| POWER LIMIT SETTING UNIT | BY USE OF AML 91 OR BIOS 30 (THE START AND STOP OF CONTROL ARE TRIGGERED WHEN SCI OR SMI IS SIGNALED BY THE CONTROLLER 40) | BY CONTROLLER 40 |
| DESCRIPTION OF POWER LIMIT | THROTTLING CONTROL CONTROL BY TCC MULTISTAGE VOLTAGE SCALING CONTROL | THROTTLING CONTROL |

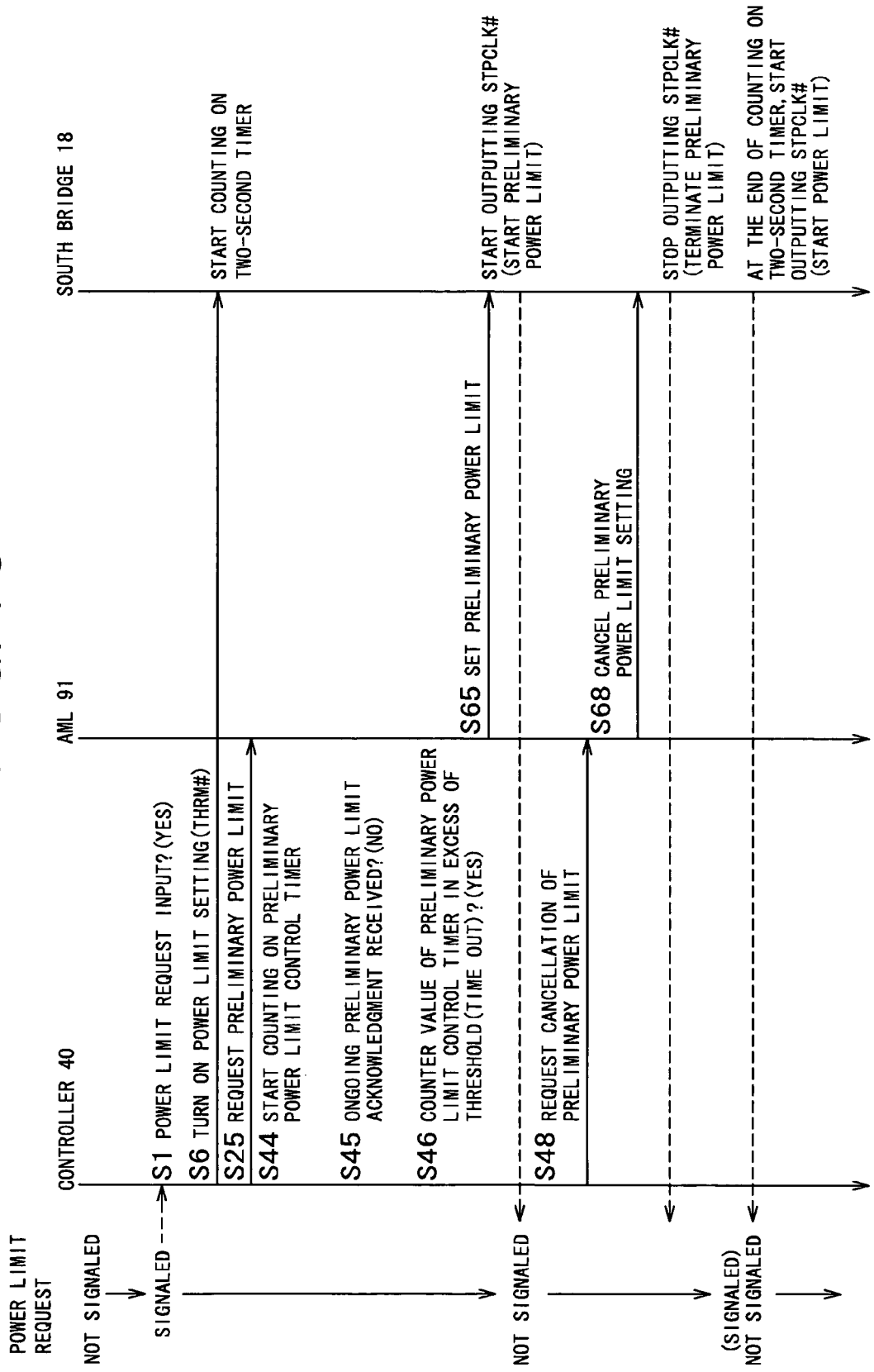

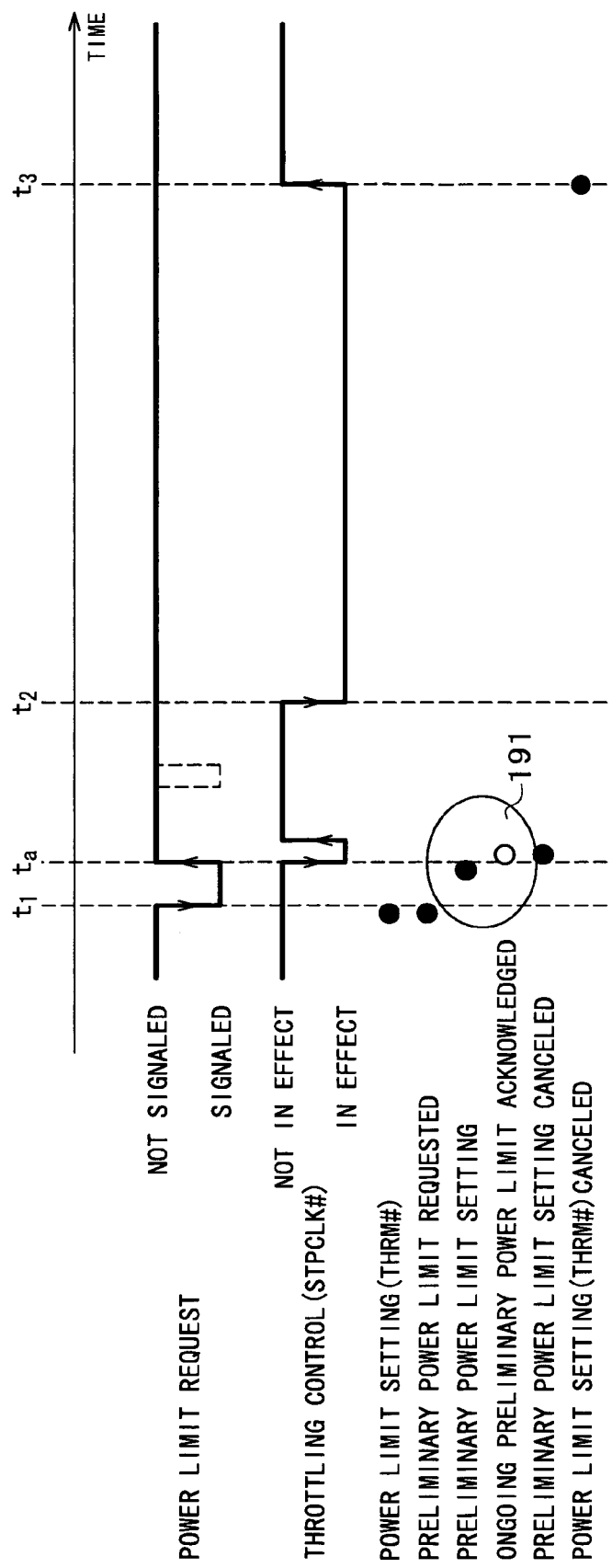

INFORMATION PROCESSING APPARATUS, INFORMATION PROCESSING METHOD, AND PROGRAM

BACKGROUND OF THE INVENTION

The present invention relates to an information processing apparatus, an information processing method, and a program. More particularly, the invention relates to an information processing apparatus, an information processing method, and a program for controlling the amount of power consumed by an information processing apparatus to an actually required level in a manner permitting easy standardization of techniques for such power management and enabling simple transport of the techniques from one apparatus to another without running the risk of quality defects.

Recent years have witnessed a dramatic increase in CPU (central processing unit) capabilities. The upsurge in performance has been accompanied by the proportionately boosted maximum consumption of power by the CPUs.

In practice, however, there are few occasions on which the CPU runs in an operating state requiring maximum power dissipation. In most cases (i.e., in normal operating state), the latest CPUs consume approximately the same level of power as their predecessors.

Under these circumstances, it has become more difficult than ever to design a power supplying apparatus (also called the power supply unit hereunder) for powering information processing apparatuses each carrying one of such high-performance CPUs.

To design a typical power supply unit requires taking into consideration the maximum power consumption of an apparatus coupled with the power supply unit. More specifically, the power supply unit is designed to deal with the putative case where the CPU incorporated in an information processing apparatus, on-board chips, internal drives, and any devices connected to external device connectors of the apparatus operate all at once at their maximum capacity.

Taking the estimated maximum power dissipation requirement into account in its design, the power supply unit tends to be large-sized and costly when implemented.

Obviously, the bulky, expensive power supply unit is not suited for use on board a portable information processing apparatus such as a mobile computer or a notebook-size personal computer (hereunder, referred to simply as the notebook PC as needed).

As mentioned above, there are few occasions on which the CPU is made to run at capacity consuming the maximum level of power. That means the power supply unit designed simply to address maximum power dissipation tends to be redundant in its performance.

On the other hand, if the power supply unit is designed merely to deal with a steady level of power consumption by the CPU in its normal operating state without regard to the possible maximum level of power consumption, then the unit is subject to an excess supply of power when the CPU runs close to its capacity.

In the face of such an excess supply of power, the power supply unit stops its feed of power to prevent quality defects. In that case, the information processing apparatus utilizing the power supply unit is abruptly deprived of power and becomes incapable of remaining consistent in its processing. In other words, data losses can occur.

It follows that devising a better power supply unit is not enough; it is also necessary to come up with techniques for reducing the level of power consumption by the information processing apparatus itself. Some of such techniques have been proposed in the past. For example, Japanese Patent Laid-open No. 2000-172387 (called the Reference 1 hereunder) discloses a method for switching operation modes of the CPU to reduce power consumption of an information processing apparatus whenever the maximum power consumption level of the apparatus is predicted to exceed a predetermined threshold value.

According to the method disclosed by the Reference 1, the maximum power consumption of the information processing apparatus is a value calculated predictively on the basis of a base load and CPU operation status specific to the apparatus in question. As one disadvantage of the method, the base load and the CPU type vary from one model of information processing apparatus to another, so that a dedicated set of predictive techniques is needed for each model. That means it takes time and effort to transport the techniques for power consumption control between different models of information processing apparatuses. This amounts to a considerable difficulty in standardizing the techniques.

According to the method of the Reference 1, it is necessary to effect power management in keeping with very large values of power limit so that quality defects will not occur even under the most rigorous conditions. This results in a power management scheme subject to a far severer amount of power limit than is actually needed. As another disadvantage of the method, the proposed power management scheme leads to an acute degradation in performance of the information processing apparatus under power limit control.

Furthermore, with the method of the Reference 1 in use, it takes time to switch operation modes of the CPU for power management (for example, it takes a delay time of two seconds for Intel Corporation's throttling mode actually to come into effect following a designated switchover to that mode). As a further disadvantage of the disclosed method, the delay time can hamper the effort to limit power consumption to a managed level in time. That means there is a possibility of quality defects taking place.

SUMMARY OF THE INVENTION

The present invention has been made in view of the above circumstances and provides an apparatus, a method and a program for controlling the amount of power consumed by an information processing apparatus to an actually required level in a manner permitting easy standardization of techniques for such power management and enabling simple transport of the techniques from one apparatus to another without running the risk of quality defects.

According to the first aspect of the present invention, there is provided an information processing apparatus having a processor, including:

power monitoring means for monitoring power consumed by the information processing apparatus, the power monitoring means further outputting a power limit request demanding a limit to the power when the power being monitored exceeds a predetermined threshold;

first setting means for setting a first control for limiting an availability factor of the processor as a limit to the power when the power monitoring means outputs the power limit request;

second setting means for setting a second control for limiting the availability factor of the processor as a limit to the power when the power monitoring means outputs the power limit request;

first controlling means for executing the first control set by the first setting means; and second controlling means for executing the second control set by the second setting means.

According to the second aspect of the present invention, there is provided an information processing method for use with an information processing apparatus having a processor, the information processing method including the steps of:

monitoring power consumed by the information processing apparatus, the power monitoring step further generating a power limit request demanding a limit to the power when the power being monitored exceeds a predetermined threshold;

firstly setting a first control for limiting an availability factor of the processor as a limit to the power when the power monitoring step generates the power limit request;

secondly setting a second control for limiting the availability factor of the processor as a limit to the power when the power monitoring step generates the power limit request;

firstly controlling execution of the first control set in the first setting step; and secondly controlling execution of the second control set in the second setting step.

According to the third aspect of the present invention, there is provided a program for use with an information processing apparatus which includes:

a processor;

a power monitoring unit for monitoring power consumed by the information processing apparatus, the power monitoring unit further outputting a power limit request demanding a limit to the power when the power being monitored exceeds a predetermined threshold;

a first controlling mechanism for executing a first control for limiting an availability factor of the processor as a limit to the power;

a second controlling mechanism for executing a second control for limiting the availability factor of the processor as a limit to the power; and a microcomputer for passing data to and from the first controlling mechanism via a first interface implemented as hardware and to and from the second controlling mechanism via a second interface implemented as software;

the program being executed by the microcomputer and including the steps of:

firstly setting the first control for the first controlling mechanism via the first interface when the power monitoring unit outputs the power limit request; and secondly setting the second control for the second controlling mechanism via the second interface when the power monitoring unit outputs the power limit request.

Through the use of the information processing apparatus, information processing method, and program according to the invention, the level of power consumed by the information processing apparatus including a processor is kept monitored. When the power being monitored is found to have exceeded a predetermined threshold, a power limit request is output to demand a limit to the power. Given the power limit request, a first and a second control are set and executed so as to limit the availability factor of the processor.

The information processing apparatus of this invention may execute the above controls based on a current flowing inside the apparatus, on a current flowing outside the apparatus, or on currents that are comprehensively detected flowing in and out of the apparatus.

The inventive arrangements described above execute controls to manage the power consumption of the information processing apparatus, particularly in such a manner as to limit the amount of power consumed by the apparatus to an actually required level while permitting easy standardization of the techniques of such power management and enabling simple transport of the techniques from one apparatus to another without running the risk of quality defects.

Other objects, features and advantages of the invention will become more apparent upon a reading of the following description and appended drawings.

BRIEF DESCRIPTION OF THE DRAWINGS

FIG. 4 is a tabular view explaining a two-stage power limit control scheme constituted by a preliminary power limit control in the first stage and a power limit control in the second stage;

FIG. 18 is an arrow diagram indicating a fourth case of processing relations between the controller, AML (or BIOS), and the south bridge in the power limit control block of FIG. 2; and FIG. 19 is a timing chart applicable to the processing of the fourth case indicated in the arrow diagram of FIG. 18.

DETAILED DESCRIPTION OF THE PREFERRED EMBODIMENTS

Figure 1:
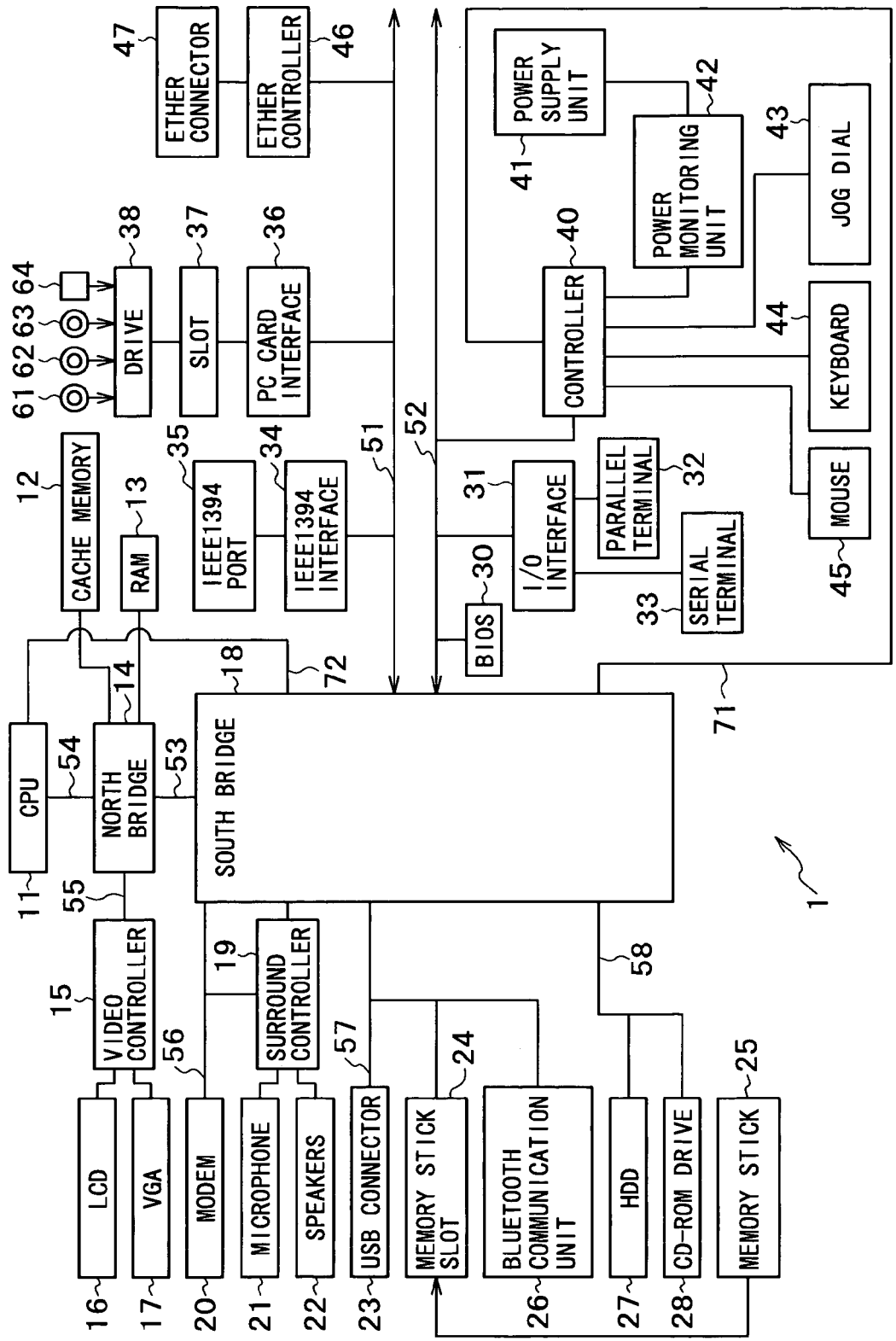
FIG. 1 is a block diagram showing a typical structure of an information processing apparatus embodying this invention.

FIG. 1 shows a typical structure of an information processing apparatus 1 embodying this invention.

In the information processing apparatus 1 of FIG. 1, a CPU 11 is constituted illustratively by a Pentium (registered trademark) processor from Intel Corporation and is connected to a front side bus (FSB) 54. The FSB 54 is connected to a north bridge 14 which has an accelerated graphics port (AGP) 55 and is linked to a bus 53 (or to a hub interface 53 in an Intel arrangement).

The north bridge 14 is illustratively composed of an AGP host bridge controller 440BX from Intel Corporation, providing control over a RAM (random access memory, working as a main memory in this setup) 13. The north bride 14 also controls a video controller 15 through the AGP 55. The video controller 15 provides control over a display unit such as an LCD (liquid crystal display) 16 or a VGA (video graphics array) display 17 (called the VGA 17 hereunder).

Upon receipt of data (image or text data) from the CPU 11, the video controller 15 either generates images corresponding to the received data or stores the received data unmodified into an internal video memory (not shown) The video controller 15 causes the LCD 16 or VGA 17 to display the images corresponding to the image data held in the video memory. Given data from the video controller 15, the LCD 16 or VGA 17 displays the applicable images or text.

The north bridge 14 is also connected to a cache memory 12. The cache memory 12 is made up of memory cells capable of executing read and write operations faster than the RAM 13 (e.g., static RAM (SRAM)). As such, the cache memory 12 caches (temporarily stores) the programs or data being used by the CPU 11.

The CPU 11 has its own primary cache inside which operates even faster than the cache memory 12. The primary cache is under control of the CPU 11 itself.

The RAM 13 is constituted illustratively by a DRAM (dynamic RAM) and stores the programs to be executed by the CPU 11 or the data necessary for the CPU 11 to work with. Specifically, upon completion of a start-up, the RAM 13 receives and accommodates the OS (operating system), Internet-related programs, etc., loaded from an HDD 27.

The OS is a program that controls the basic functions of a computer, exemplified by Windows (registered trademark) XP from Microsoft Corporation or Mac OS (registered trademark) from Apple Computer Incorporated.

The north bridge 14 is further connected to a south bridge 18 through the hub interface 53. The south bridge, constituted illustratively by PIIX4E from Intel Corporation, controls various I/O (input/output) components such as an AC97 link bus 56, a USB bus 57, and a device coupled to an IDE bus 58.

More specifically, the AC97 link bus 56 is connected to a modem 20 and a surround controller 19. The modem 20, connected to a public switched network, conducts communication processes by way of the public switched network or the Internet (neither shown). The surround controller 19 is connected to a microphone 21 and speakers 22. In operation, the surround controller 19 captures sounds through the microphone 21 and generates data corresponding to the captured sounds. The surround controller 19 further drives the speakers 22 to output sounds.

The USB bus 57 linked to the south bridge 18 is coupled with a USB connector 23 that permits connection of various USB devices. The USB bus 57 also provides connection between a Memory Stick (registered trademark) slot 24 and a Bluetooth communication unit 26. The Memory Stick slot 24 is loaded with a Memory Stick 25.

The Memory Stick 25 is a flash memory card developed by Sony Corporation, i.e., this applicant. The Memory Stick is made up of flash memory cells forming a nonvolatile memory known as an EEPROM (electrically erasable and programmable read only memory), housed in a thin, small-size plastic case measuring 21.5 mm by 50 mm by 2.8 mm. The memory card has a 10-pin terminal that permits read and write operations of diverse data such as images, voice and music to and from the memory. The Bluetooth communication unit 26 conducts communications based on the Bluetooth standard.

The IDE bus 58 linked to the south bridge 18 is connected to a hard disc drive (HDD) 27. The IDE bus 58 is further connected electrically to a so-called IDE device such as a CD-ROM (compact disc-read only memory) drive 28.

The south bridge 18 is capable of causing the CPU 11 to execute what is known as throttling control via a signal line 72. The primary objective of the throttling control is to reduce heating of the CPU 11. More specifically, the throttling control involves driving the CPU 11 on and off so as to lower the clock frequency equivalently (i.e., driving the CPU 11 intermittently to reduce the mean clock frequency). In other words, the throttling control amounts to limiting the availability factor of the CPU 11 thereby managing CPU power consumption.

The south bridge 18 is also connected to a PCI (Peripheral Component Interconnect) bus 51 and an LPC (low pin count) bus 52.

The LPC bus 52 is connected to a BIOS (Basic Input Output System) 30, an I/O (input/output) interface 31, and a controller 40.

The BIOS 30 is a group of programs making up a collection of basic operating instructions. As such, the BIOS 30 is stored illustratively in a ROM (read only memory), not shown. In operation, the BIOS 30 controls data passing (input and output) between the OS or application programs on the one hand and peripheral devices on the other hand.

The I/O interface 31 is connected to a parallel terminal 32 and a serial terminal 33. Data are exchanged through the I/O interface 31 with devices connected to these terminals.

The controller 40 is connected to such input devices as a jog dial 43, a keyboard 44, and a mouse 45. The controller 40 is further connected to a power monitoring unit 42.

The controller 40 is constituted illustratively by a microcomputer controlling the input devices like the jog dial 43, keyboard 44 and mouse 45.

With this embodiment of the invention, the controller 40 is connected to the south bridge 18 via a signal line 71 formed as part of hardware. As will be discussed later, the controller 40 sets the above-mentioned throttling control for the south bridge 18 based on the result of monitoring by the power monitoring unit 42. In this case, the signal line 71 transmits to the south bridge 18 a signal which is output by the controller 40 and which is needed for the setting of the throttling control.

Also with this embodiment, controls other than the throttling control may be effected to limit the availability factor of the CPU 11 in order to limit the power consumption of the information processing apparatus 1. The controls may be set illustratively by software programs. The controller 40 also performs processes requesting the software programs to set the controls. Details of the processes will be described later.

A power supply unit 41 is a device that feeds power to the information processing apparatus 1 as a whole. In this example, the power supply unit 41 may be constituted illustratively by an AC (alternating current) power supply adapter or by a battery.

The power monitoring unit 42 monitors the power which, supplied by the power supply unit 41, is actually consumed by the information processing apparatus 1. The result of the monitoring is sent from the power monitoring unit 42 to the controller 40. The power monitoring unit 42 will be discussed later in more detail with reference to FIG. 3.

The PCI bus 51 is connected to an IEEE (Institute of Electrical and Electronics Engineers) 1394 interface 34, a PC card interface 36, and an Ether controller 46.

The IEEE 1394 interface 34 sends and receives data based on the IEEE 1394 standard (i.e., in the form of packetized data) through an IEEE 1394 port 35.

The PC card interface 36 supplies the CPU 11 or RAM 13 with the data sent from a device (card, not shown) inserted in a slot 37. The PC card interface 36 also forwards the data coming from the CPU 11 to the card inserted in the slot 37.

As shown in FIG. 1, the slot 37 is connected with a drive 38 when necessary. In this case, the drive 38 is coupled to the PCI bus 51 through the slot 37 and PC card interface 36. The drive 38 is loaded with a magnetic disc 61, an optical disc 62, a magneto-optical disc 63, or a semiconductor memory 64. The drive 38 reads data from the loaded recording medium, and feeds the retrieved data to the RAM 13. The drive 38 further records the data generated by the CPU 11 to the magnetic disc 61, optical disc 62, magneto-optical disc 63, or semiconductor memory 64 loaded in the drive 38.

The Ether controller 46 communicates with another information processing apparatus, not shown, via a network such as a LAN (local area network) connected to an Ether connector 47.

As mentioned earlier, CPUs having high frequencies and operating at relatively high levels of power consumption have come into general use in recent years. Also gaining widespread use are information processing apparatuses in the form of mobile computers and notebook-size PCs. Because these apparatuses are supposed to be used in portable fashion, the power supply unit 41 for use therewith is not to be limited to an AC power supply adapter; the unit 41 may also be implemented as a battery arrangement.

Under these circumstances, if a CPU 11 having a high frequency and running at an elevated level of power consumption is to be incorporated into the notebook-size PC (i.e., information processing apparatus 1), measures need to be taken to lower the overall power consumption of the apparatus 1 in order to prolong the life of the battery and to reduce the battery size.

These measures adopted by the information processing apparatus 1 of this invention involve detecting a total current (i.e., an actually flowing current) consumed by the apparatus 1 so as to determine whether the detected current level exceeds a predetermined threshold. If the threshold is found exceeded, the availability factor of the CPU 11 is limited (i.e., the clock frequency is lowered), whereby the power consumption of the apparatus 1 is controlled. This type of control is called the power limit control in this specification.

The power limit control will be shown hereunder implemented by, but not limited to, the above-mentioned throttling control.

In this example, the start of the throttling control is triggered by a signal (power control request shown in FIG. 2, to be described later) output by the power monitoring unit 42. If the power monitoring unit 42 is constituted by hardware and incorporated in the information processing apparatus 1, the setup eliminates the need for the OS, application programs and control tables which were needed conventionally to output the trigger. This means that one of the problems discussed in connection with the prior art is resolved by the inventive arrangement. That is, the techniques for power limit control are easily standardized and transported between different models of information processing apparatuses.

However, when the power monitoring unit 42 outputs the signal to trigger the start of the throttling control (power control request in FIG. 2, to be described later), the throttling control is not started immediately; the control is started upon elapse of a predetermined time period set forth for the south bridge 18 (e.g., two seconds specified for the south bridge 18 from Intel Corporation).

In other words, simply carrying out the throttling control does not resolve the other problems of the prior art discussed earlier, i.e., acute degradation in performance of the information processing apparatus under power limit control, and the possibility of quality defects taking place.

These problems are addressed by the inventive information processing apparatus 1 resorting to what is called multistage power limit control, whereby the power consumption of the apparatus 1 is limited to an actually needed level even as quality defects are prevented.

With this embodiment, the multistage power limit control is implemented illustratively in two stages for purpose of simplification and illustration. In the description that follows, power limit control in the first stage (i.e., initially executed power limit control) is called the preliminary power limit control, and power limit control in the second stage (i.e., power limit control performed after the preliminary power limit control has started) is called the power limit control.

What follows is a description of how the preliminary power limit control and the power limit control are illustratively carried out. It should be noted that the ensuing specificities are provided merely to give some illustrations; they may be implemented otherwise.

Three alternatives are available as the preliminary power limit control: throttling control, TCC (thermal control circuit) control, and multistage voltage scaling control. One of the three controls is used selectively. The TCC control and multistage voltage scaling control will each be described later in more detail. For the power limit control, the throttling control is adopted.

Figure 2:
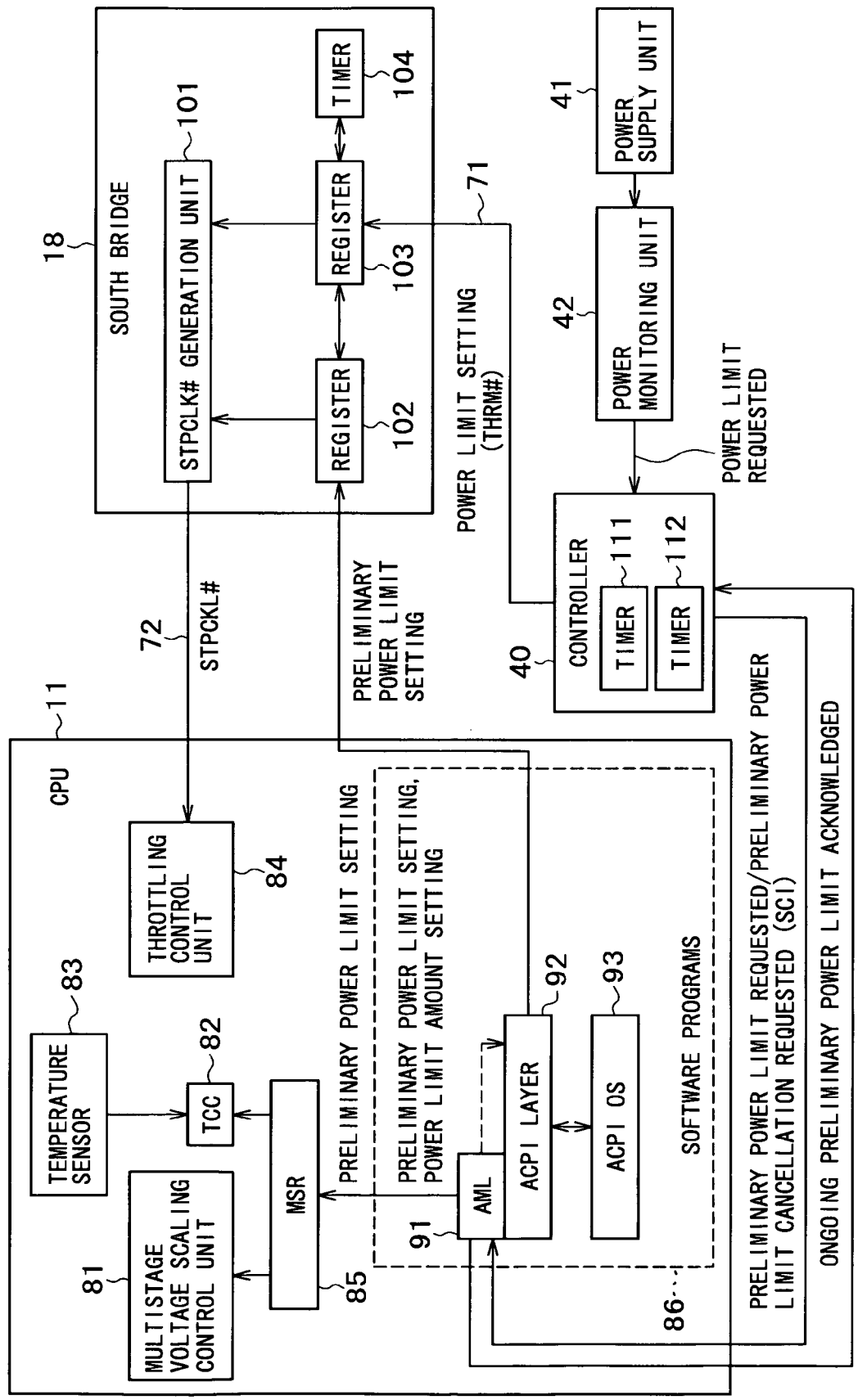
FIG. 2 is a function block diagram depicting a typical structure of a power limit control block in the information processing apparatus of FIG. 1.

FIG. 2 is a function block diagram depicting a detailed structure of the major components for executing the preliminary power limit control and the power limit control in the information processing apparatus 1 of FIG. 1.

For purpose of simplification and illustration, the components shown in FIG. 2 are assumed to constitute a single device called a power limit control block.

The power limit control block is made up of the CPU 11, south bridge 18, controller 40, power supply unit 41, and power monitoring unit 42.

The power supply unit 41, illustratively composed of an AC power adapter or a battery, feeds power to the information processing apparatus 1 (FIG. 1). The target entity powered by the power supply unit 41 is called the system. That is, the system refers to the information processing apparatus 1 as a whole.

The power supply unit 41 is subject to such design specifications as the rated power, peak power, peak power duration, and duty rate (i.e., rate of the period in which system power consumption remain below the rated power, to the period in which system power consumption exceeds the rated power) stipulated for the unit.

The power monitoring unit 42, implemented illustratively by hardware, monitors the level of power supplied from the power supply unit 41 to the system. When the power being monitored is found to have exceeded a predetermined threshold, the power monitoring unit 42 outputs to the controller 40 a signal requesting execution of the preliminary power limit control and power limit control (the latter is executed only when needed). The signal is called the power limit request.

Figure 3:
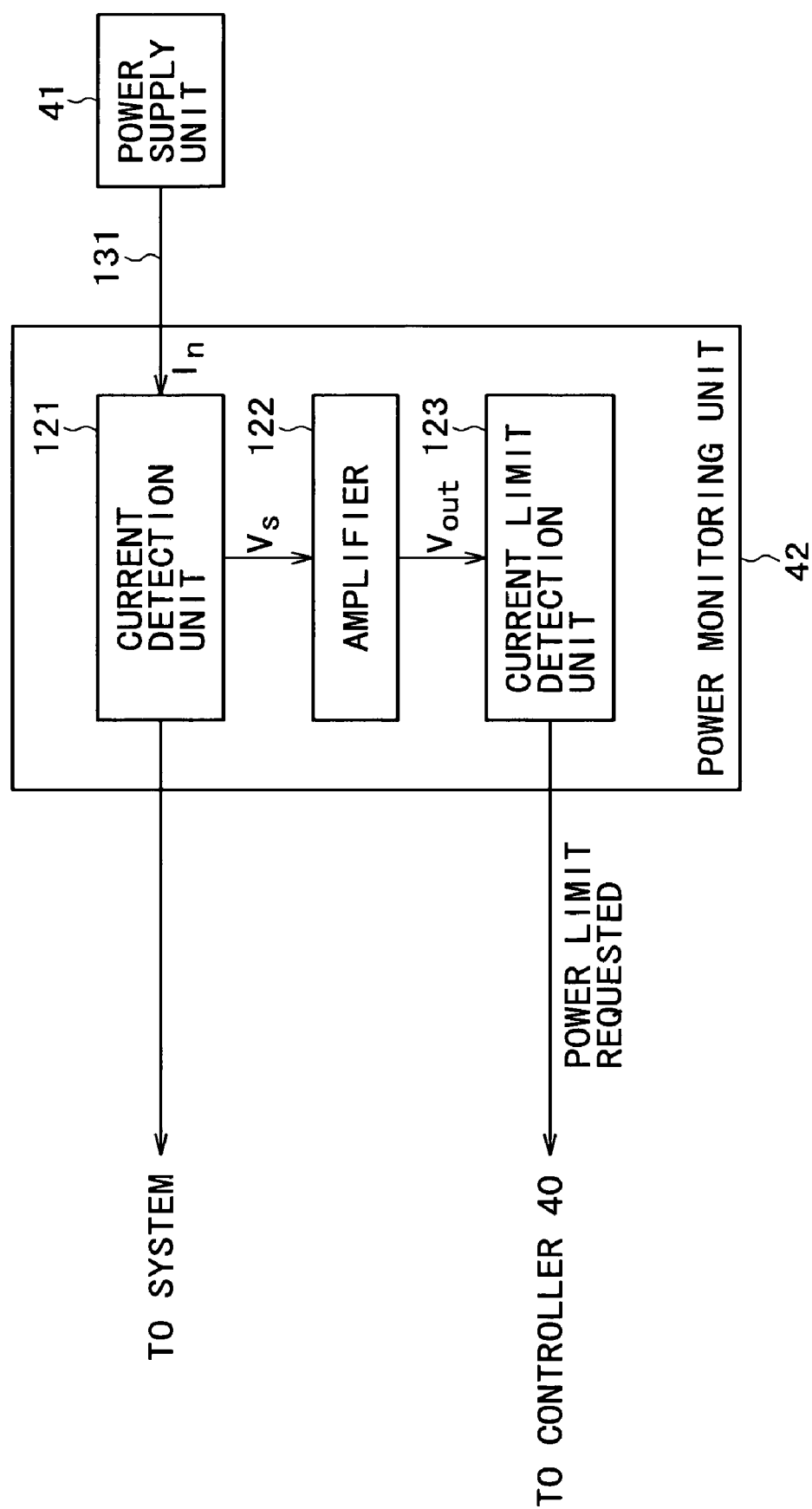
FIG. 3 is a block diagram illustrating a detailed structure of a power monitoring unit included in FIG. 2.

FIG. 3 illustrates a detailed structure of the power monitoring unit 42 included in FIG. 2. The power monitoring unit 42 is described below in detail with reference to FIG. 3.

In FIG. 3, the power supply unit 41 feeds all currents that are consumed by the system (information processing apparatus 1) through a power transmission line 131 and a power detection unit 121. That is, the power transmission line 131 is laid out inside the system in such a manner that the entire system is fed with the necessary currents through the line.

The current detection unit 121 is implemented illustratively as a detecting resistor. A current In flowing over the power transmission line 131 is detected as a voltage across the detecting resistor. That is, the current detection unit 121 detects the current In as the voltage Vs given by the following expression (1):

$$Vs = In \times Rs \tag{1}$$

where, Rs denotes the resistance value of the detecting resistor in the current detection unit 121.

An amplifier 122, constituted illustratively by an operational amplifier, amplifies by a gain G the voltage Vs detected by the current detection unit 121 (i.e., the voltage value is multiplied by the value G). The result of the amplification is output as a voltage Vout to a current limit detection unit 123. The output voltage from the amplifier 122 is given by the following expression (2):

$$Vout = G \times Vs \tag{2}$$

where, G stands for a suitable integer (20 for this example).

The power limit detection unit 123 inputs the output voltage Vout from the amplifier 122, and calculates the level of the current In flowing over the power transmission line 131 (i.e., the current consumed by the system) based on the voltage Vout. If the calculated level of the current In is found to have exceeded a predetermined limiting level (corresponding to a limiting value of the current In), then the power limit detection unit 123 outputs a power limit request to the controller 40.

More specifically, since the power supply unit 41 is generally implemented as a constant voltage source, it is possible to calculate the power consumed by the system (i.e., the information processing apparatus 1 of FIG. 1 as a whole) on the basis of the current In flowing through the power transmission line 131.

Thus if the current In actually flowing over the power transmission line 131 at a given point in time is found to have exceeded a current (called a limiting current Iinplimit) corresponding to the rated power (called the limiting power Pinplimit for use as a limiting value) of the power supply unit 41, then the power limit detection unit 123 determines that the power being consumed by the system has exceeded the limiting power Pinplimit at that point in time, and outputs the power limit request to the controller 40 accordingly.

Between the limiting power Pinplimit and the limiting current Iinplimit exists the relationship defined by the following expression (3):

$$Pinplimit = Vin \times Iinplimit \tag{3}$$

where, Vin stands for the output voltage of the power supply unit 41.

Returning to FIG. 2, the controller 40 detects the power limit request output by the power monitoring unit 42. With the request detected, the controller 40 sets the power limit control (of the second stage) to a register 103 of the south bridge 18 through the signal line 71 formed as hardware. In other words, the signal line 71 serves as a hardware interface between the controller 40 and the south bridge 18.

In the description that follows, the signal which is needed for the setting of the power limit control and which is transmitted over the signal line 71 will be called a power limit setting. For the south bridge from Intel Corporation, the power limit setting is specifically called THRM#.

As will be discussed later, when the controller 40 outputs a power limit setting (THRM#), the throttling control is not carried out immediately (i.e., the signal STPCLK# for triggering execution of the throttling control, to be described later, is not output immediately). That is, the throttling control is performed after a predetermined time period (e.g., two seconds specified for the south bridge 18 from Intel Corporation) has elapsed (i.e., the signal STPCLK# is output).

It follows that, where the power limit control (throttling control) alone is executed based on the power limit setting (THRM#), two of the problems associated with the prior art (acute degradation in performance of the information processing apparatus under power limit control, and the possibility of quality defects taking place) are not resolved as mentioned above.

To address the problems, the controller 40 of this invention outputs the power limit setting (THRM#) to the south bridge 18 while signaling at about the same time to AML (ACPI machine language) 91 a piece of information for requesting execution of the preliminary power limit control (simply called the preliminary power limit request hereunder) by use of an SCI (system control interrupt).

What follows is a description of the SCI and AML in view of their relevance to this invention.

For example, of the operating systems released so far by Microsoft Corporation, Windows (registered trademark) 98 and subsequent versions support an interface with peripherals called ACPI (Advanced Configuration and Power Interface). The operating systems supporting ACPI are called an ACPI OS each. Illustratively in the setup of FIG. 2, the ACPI OS is represented by an ACPI OS 93.

Application programs that run under the ACPI OS and software programs that control data passing (input and output) to and from peripheral devices are collectively referred to as the ACPI layer. In FIG. 2, for example, the ACPI layer is represented by an ACPI layer 92 that controls the south bridge 18 and controller 40 as peripherals.

The ACPI layer 92 varies from one type of information processing apparatus to another. This constraint is circumvented by a program called AML (a compiled description language) in the BIOS 30 (FIG. 1). AML permits data passing (input and output) to and from peripherals regardless of the apparatus type (i.e., independent of the ACPI layer type), and is loaded and executed as needed. In the setup of FIG. 2, AML is represented by the above-mentioned AML 91 which acts as a software interface with peripherals.

Control by the AML 91 is effected using an interruption called SCI. On detecting an SCI, the AML 91 identifies the peripheral device that has issued it (controller 40 in this example), and carries out the control corresponding to the detected SCI.

More specifically, suppose that the AML 91 has detected an SCI from the controller 40 and has determined that the SCI corresponds to the above-mentioned preliminary power limit request. In that case, the AML 91 sets the preliminary power limit control (power limit control of the first stage), to be described later in more detail. The information necessary for setting the preliminary power limit control is simply called a preliminary power limit control setting.

In the setup of FIG. 2, the CPU 11 carries out software programs 86 in the ACPI environment as described. The software programs 86 include the ACPI OS 93, AML 91 and ACPI layer 92 for controlling data passing to and from peripheral devices (south bridge 18 and controller 40), and application programs (not shown) that run under the ACPI OS 93.

In a non-ACPI environment (i.e., an environment under an OS other than the ACPI OS), data passing (input and output) to and from the peripheral devices is controlled by the BIOS 30 (FIG. 1). In this case, the interruption corresponding to the SCI of ACPI is called an SMI (system management interrupt). Thus in the non-ACPI environment, not shown, an OS other than the ACPI OS is used; the BIOS 30 takes the place of the AML 91 and ACPI layer 92; and a preliminary power limit request and a preliminary power limit cancel request are issued through the use of SMIs, not SCIs.

After setting the preliminary power limit control, the AML 91 signals the controller 40 that the preliminary power limit control has been set. Specifically, the AML 91 gives an acknowledgment in response to the preliminary power limit request coming from the controller 40. The acknowledging response is called an ongoing preliminary power limit acknowledgment (ACK).

The controller 40 has two timers 111 and 112. The timer 111, used for the power limit control (in the second stage), measures the time to cancel the power limit control. The timer 112 for the preliminary power limit control (in the first stage) measures the time to cancel the preliminary power limit control. How the timers 111 and 112 are used will be discussed later in more detail.

The CPU 11 has a multistage voltage scaling control unit 81, a TCC (thermal control circuit) 82, and a throttling control unit 84. These components serve to limit the availability factor of the CPU 11 (i.e., to reduce the clock frequency).

The multistage voltage scaling control unit 81 carries out multistage voltage scaling control, which involves controlling the voltage for the CPU 11 over multiple stages in keeping with clock frequencies.

More specifically, the power consumption of the CPU 11 is in proportion to its clock frequency (i.e., availability factor of the CPU 11). The power consumption of the CPU 11 is also proportional to the square of the voltage applied to the CPU 11. That means lowering the voltage fed to the CPU 11 reduces the clock frequency of the CPU 11 (i.e., decreases the availability factor of the CPU 11). This is the operating principle for the multistage voltage scaling control. From among a number of stages of voltages set beforehand for application to the CPU 11 under this control scheme, the voltage corresponding to a desired clock frequency of the CPU 11 (availability factor) is selected and fed to the CPU 11.

What is noticeable about the multistage voltage scaling control is that multiplying by 1/n the voltage applied to the CPU 11 translates into the CPU clock frequency (availability factor) being multiplied not by 1/n but by 1/n squared (1/n^2). That is, compared with the throttling control or TCC control (to be discussed later), the multistage voltage scaling control provides a significantly high controlling effect (i.e., in terms of the ratio of a decline in the availability factor of the CPU 11 to the setting (the decrease in the voltage under the multistage voltage scaling control)).

The multistage voltage scaling control is given various names by manufacturers: SpeedStep (trademark) by Intel Corporation, PowerNow (trademark) by Advance Micro Devices Incorporated (AMD), and LongRun (trademark) by Transmate Corporation.

The TCC 82 constitutes a temperature managing mechanism in combination with a temperature sensor 83 embedded in the chip to measure the chip temperature. When the measurement of the temperature sensor 83 exceeds a predetermined temperature, the TCC 82 stops the operation of the CPU 11 at fixed intervals in order to reduce the heating. The operation results in a reduction of the power consumption by the CPU 11.

Such control executed by the TCC 82 is called the TCC control in this specification. The TCC control is called On-Demand CC by Intel Corporation.

The throttling control unit 84 carries out the throttling control upon detecting a signal called STPCLK#, to be described later.

The CPU 11 also has a model-specific register (MSR) 85. The MSR 85 has information set thereto which is needed to specify execution of the multistage voltage scaling control or the TCC control.

For example, if the multistage voltage scaling control is selected as the preliminary power limit control, the AML 91 sets to the MSR 85 the information necessary for executing the multistage voltage scaling control as the preliminary power limit control. In turn, the MSR 85 instructs the multistage voltage scaling control unit 81 to perform the multistage voltage scaling control.

As another example, if the TCC control is selected as the preliminary power limit control, the AML 91 sets to the MSR 85 the information needed to carry out the TCC control. In turn, the MSR 85 instructs the TCC 82 to execute the TCC control.

What happens when the throttling control is selected as the preliminary power limit control will be discussed later.

The south bridge 18 has an STPCLK# generation unit 101, registers 102 and 103, and a timer 104. These components are provided to have the CPU 11 (more specifically, the throttling control unit 84) execute the throttling control.

The STPCLK# generation unit 101 generates a signal (called STPCLK# as mentioned above) for instructing the throttling control unit 84 of the CPU 11 to carry out the throttling control. The generated signal is output to the throttling control unit 84 over the signal line 72 formed as hardware.

The STPCLK# generation unit 101 receives an STPCLK# generation command (called the generation command hereunder) from the register 102 or 103. In response, the STPCLK# generation unit 101 starts generating the signal STPCLK#.

As long as the generation command is being input, the STPCLK# generation unit 101 keeps outputting the signal STPCLK# (i.e., to let the throttling control unit 84 carry out the throttling control continuously). When the input of the generation command is stopped, the STPCLK# generation unit stops outputting the signal STPCLK# (causing the throttling control unit 84 to stop the throttling control).

Illustratively, if the throttling control is selected as the preliminary power limit control, the AML 91 writes "ON" or "OFF" to the register 102 as preliminary power limit setting. As soon as "ON" is written to the register 102, the register 102 outputs the generation command to the STPCLK# generation unit 101. As soon as "OFF" is written to the register 102, the register 102 stops outputting the generation command.

On the other hand, if the power monitoring unit 42 outputs a power limit request, the controller 40 writes "ON" or "OFF" to the register 103 as power limit setting (THRM#). With "ON" written therein, the register 103 does not output a generation command immediately and thereby allows the timer 104 to start counting. When the timer 104 has counted a predetermined time period (two seconds for the south bridge 18 from Intel Corporation), with "ON" still held in the register 103, the register 103 outputs a generation command to the STPCLK# generation unit 101. Thereafter, the register 103 stops outputting the generation command as soon as "OFF" is written thereto.

The information set to the registers 102 and 103 is described here as "ON" or "OFF" for purpose of simplification and illustration. In practice, a "0" (Low level) or a "1" (High level) may be written corresponding to the "ON" or "OFF" information respectively. What is written to the registers 102 and 103 is not limited to "ON" or "OFF" and "0" or "1"; any other suitable information may be set to the registers for the purpose.

In the description that follows, writing "ON" or "OFF" to the register 102 or 103 may be referred to as setting the register on or off respectively, where appropriate.

The generation command output by the register 102 takes precedence over that which is output by the register 103.

The tabular view of FIG. 4 summarizes what has been discussed so far. That is, FIG. 4 sketches functionally the power limit control block of the invention for setting the preliminary power limit control and the power limit control, along with an outline of the features of power management implemented thereby.

In the power limit control block structured as shown in FIG. 2, the power monitoring unit 42 formed as hardware outputs a power limit request. The output of the request triggers in a substantially instantaneous manner the execution of the preliminary power limit control (multistage voltage scaling control, TCC control, or throttling control). Thereafter, upon elapse of a predetermined time period (two seconds for the south bridge from Intel Corporation), the power limit control (throttling control) is carried out. This procedure makes it possible to limit the power consumption by the information processing apparatus to an actually needed amount while preventing quality defects taking place. That means the problems discussed earlier in connection with the prior art are now resolved.

If the AML 91 does not cancel the preliminary power limit control, both the preliminary power limit control and the power limit control will be carried out concurrently. In such a case, the combined effect (i.e., reduction in the availability factor of the CPU 11) equals the effect of the preliminary power limit control being multiplied by that of the power limit control. The concurrent execution of the two kinds of control should be pursued actively if it is desired to maximize the control effect.

However, too much effect can lead to a degradation in performance of the information processing apparatus 1 under power limit control. That is, one of the problems discussed in conjunction with the prior art can reemerge and remain unresolved.

In that case, the controller 40 using an SCI may signal to the AML 90 a request for canceling the preliminary power limit control before the power limit control is started (the request is called a preliminary power limit cancel request). On receiving the preliminary power limit cancel request, the AML 91 immediately cancels the preliminary power limit control and thereby stops execution of the preliminary power limit control before the start of the power limit control. The concurrent execution of the preliminary power limit control and the power limit control is thus avoided.

If the preliminary power limit control and the power limit control are the throttling control each, it is not mandatory to signal the preliminary power limit cancel request before the start of the power limit control. Still, in the present embodiment of the invention, the preliminary power limit cancel request is signaled to the AML 91 before the start of the power limit control regardless of the type of the preliminary power control limit being implemented.

The transitions of the operating state of the power limit control block in FIG. 2 will now be described with reference to FIG. 5. What is shown in FIG. 5 is one example of state transitions that the power limit control block undergoes.

Figure 5:
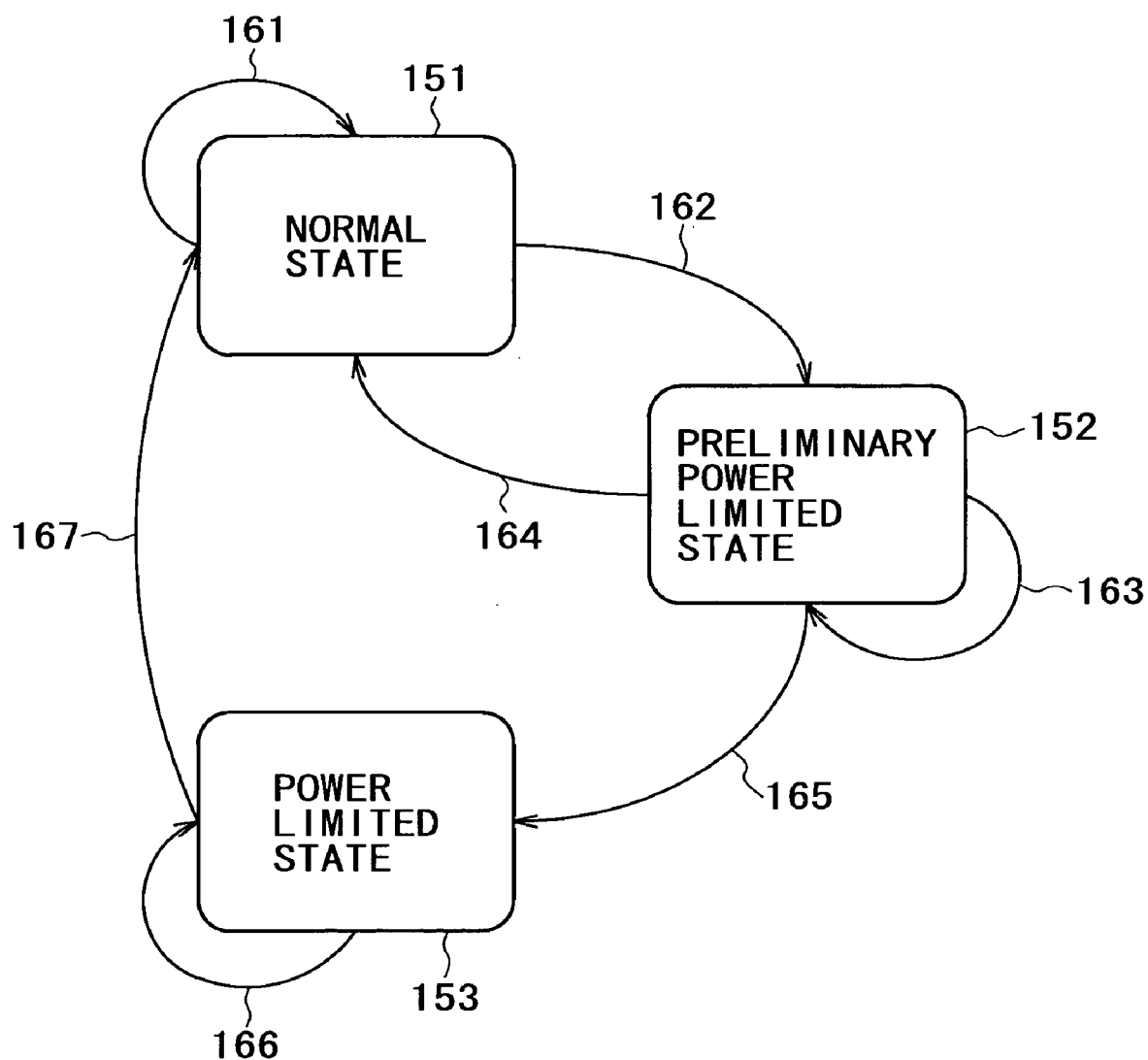
FIG. 5 is a state transition diagram depicting transitions of the operating state of the power limit control block in FIG. 2.

As shown in FIG. 5, the power limit control block is in one of three states: a normal state 151, a preliminary power limited state 152, or a power limited state 153.

The normal state 151 refers to a state in which the power limit control block carries out neither the preliminary power limit control nor the power limit control.

The preliminary power limited state 152 is a state in which the power limit control block executes the preliminary power limit control.

The power limited state 153 is a state where the power limit control block performs the power limit control.

It will be appreciated that the example in FIG. 5 is one in which the power limit control and the preliminary power limit control are not carried out simultaneously.

When a certain condition (called a state transition control) is fulfilled, a transition takes place from one state to another (or the currently effective state remains unchanged) among the normal state 151, preliminary power limited state 152, and power limited state 153.

In the example of FIG. 5, state transition conditions are indicated by arrows numbered 161 through 167 each denoting a possible transition from one state to another among the normal state 151, preliminary power limited state 152, and power limited state 153.

Illustratively, suppose that the initial state (state in effect when the power supply unit 41 has started powering the system, i.e., information processing apparatus 1 of FIG. 1) is the normal state 151 and that this is the state the power limit control block initially finds itself in.

On the above assumption, the power monitoring unit 42 does not output a power limit request unless and until the power being monitored exceeds a predetermined threshold. While the power level remains below the threshold, the controller 40 determines that the state transition condition 161 is satisfied and causes accordingly the power limit control block to make a transition from the normal state 151 to the normal state 151 (i.e., the initial state remains unchanged).

If the power being monitored is found to exceed the threshold, the power monitoring unit 42 outputs the power limit request to the controller 40. In this case, the controller 40 determines that the state transition condition 162 is fulfilled and causes accordingly the power limit control block to make a transition from the normal state 151 to the preliminary power limited state 152.

When the power limit control block enters the preliminary power limited state 152, the controller 40 sets execution of the first control (i.e., power limit control) to reduce the availability factor of the CPU 11 thereby limiting the consumed power. That is, the power limit setting (THRM#) is set to "ON."

In turn, the register 103 causes the timer 104 to start counting. At this point, the register 103 does not yet output the generation command to the STPCLK# generation unit 101, so that the power limit control (throttling control) is not carried out.

Meanwhile, the AML 91 recognizes the output of the power limit request from the power monitoring unit 42 upon receipt of a preliminary power limit request (SCI) from the controller 40. The AML 91 then generates information, that is, preliminary power limit setting, for setting execution of the second control (i.e., preliminary power limit control), whereby the availability factor of the CPU 11 is reduced to limit the power consumption.

After signaling the preliminary power limit request (SCI) to the AML 91, the controller 40 causes the preliminary power limit control timer 112 to start counting.

In the setup of FIG. 2, any one of the three controls is selectively usable as the preliminary power limit control: multistage voltage scaling control performed by the multistage voltage scaling control unit 81, TCC control by the TCC 82, or throttling control by the throttling control unit 84.

For example, if the multistage voltage scaling control is to be used as the preliminary power limit control, the AML 91 sets to the MSR 85 the setting information for executing the multistage voltage scaling control. In turn, the MSR 85 issues a control start command to the multistage voltage scaling control unit 81. Given the start command, the multistage voltage scaling control unit 81 carries out the multistage voltage scaling control as instructed by the AML 91.

As another example, if the TCC control is to be used as the preliminary power limit control, the AML 91 sets to the MSR 85 the setting information for executing the TCC control. In turn, the MSR 85 issues a control start command to the TCC 82. Given the start command, the TCC 82 performs the TCC control as instructed by the AML 91.

As yet another example, if the throttling control is to be used as the preliminary power limit control, the AML 91 sets the setting information for executing the throttling control. More specifically, the AML 91 writes "ON" to the register 102 of the south bridge 18. In turn, the register 102 outputs a generation command to the STPCLK# generation unit 101. Given the generation command, the STPCLK# generation unit 101 generates a signal STPCLK# and sends the generated signal to the throttling control unit 84 over the signal line 72. On detecting the signal STPCLK#, the throttling control unit 84 carries out the throttling control as instructed by the AML 91.

As described, when the power monitoring unit 42 outputs the power limit request (thereby bringing the power limit control block into the preliminary power limited state 152), the preliminary power limit control is executed almost instantaneously.

When the power monitoring unit 42 outputs the power limit request, the power limit setting (THRM#) is set to "ON." But the register 103 does not output the generation command to the STPCLK# generation unit 101 until a predetermined time period elapses on the timer 104 (two seconds for the south bridge 18 from Intel Corporation). That is, the power limit control is not performed immediately upon output of the power limit request from the power monitoring unit 42; the control is executed only after the timer 104 has finished its counting.

When canceling the preliminary power limit control, the controller 40 signals a preliminary power limit cancel request to the AML 91 by use of an SCI. In other words, the preliminary power limit control remains in effect unless and until the controller 40 signals the preliminary power limit cancel request to the AML 91 using the SCI. As illustrated, the state transition condition 163 is a condition requiring that the preliminary power limit cancel request not be signaled. As long as the state transition condition 163 is being met, the power limit control block is thus in transition from the preliminary power limited state 152 to the preliminary power limited state 152 (i.e., the current state remains unchanged).

When the controller 40 signals the preliminary power limit cancel request to the AML 91 by use of the SCI, the preliminary power limit control is brought to and end. That means the power limit control block makes a transition from the preliminary power limited state 152 either to the normal state 151 or to the power limited state 153.

That is, if the controller 40 determines that the preliminary power limit control currently in effect has succeeded, the controller 40 using the SCI signals the preliminary power limit cancel request to the AML 91 and cancels the power limit control as well (by setting the power limit setting (THRM#) to "OFF"). In such a case, the state transition condition 164 is found to be met, so that the power limit control block makes a transition from the preliminary power limited state 152 to the normal state 151.

At that point, the register 103 causes the timer 104 to stop its counting and to initialize its counter. That is, the power limit control is not carried out when the preliminary power limit control having been executed so far is found to have succeeded.

On the other hand, if the controller 40 determines that the preliminary power limit control in execution so far has failed, the controller 40 signals a preliminary power limit cancel request to the AML 91 using an SCI. At this point, it should be noted, the power limit control is not canceled (i.e., the power limit setting (THRM#) remains on). Thus the state transition condition 165 is found to be met, so that the power limit control block makes a transition from the preliminary power limited state 152 to the power limited state 153.

The timer 104 terminates its counting in the south bridge 18 thereafter (upon elapse of two seconds for the south bridge from Intel Corporation). At this point, the register 103 outputs a generation command to the STPCLK# generation unit 101. Given the generation command, the STPCLK# generation unit 101 generates STPCLK# and outputs the generated signal to the throttling control unit 84 over the signal line 72. On detecting the signal STPCLK#, the throttling control unit 84 carries out the throttling control (power limit control) based on the power limit setting (THRM#).

Whether or not the preliminary power limit control has been successful is determined by this embodiment illustratively in accordance with the following criteria:

With the preliminary power limit control under execution, the controller 40 keeps monitoring the output of a power limit request from the power monitoring unit 42. If no power limit request has been detected during execution of the preliminary power limit control (i.e., from the time an ongoing preliminary power limit acknowledgment was detected until the preliminary power limit control timer 112 ends its counting), then the controller 40 determines that the preliminary power limit control carried out so far has been successful.

On the other hand, if even a single power limit request has been detected during execution of the preliminary power limit control, the controller 40 determines that the preliminary power limit control performed so far has failed.

If no ongoing preliminary power limit acknowledgment has been output (i.e., detected) by the AML 91 during the predetermined time period (counted by the preliminary power limit control timer 112), the controller 40 also determines that the preliminary power limit control has been unsuccessful.

The count time of the preliminary power limit control timer 112 will be described later in more detail.

When the power limit control block goes into the power limited state 153, the power limit control (throttling control based on the power limit setting (THRM#)) is carried out as described above.

At this point, the power limit control timer 111 is still counting (the time at which to start counting will be discussed later). At the end of the counting by the timer 111, the controller 40 cancels the power limit control. More specifically, the controller 40 sets the power limit setting (THRM#) to "OFF." This causes the register 103 to stop outputting the generation command. On detecting the absence of the generation command, the STPCLK# generation unit 101 stops outputting the signal STPCLK#. When detecting the absence of the signal STPCLK#, the throttling control unit 84 terminates execution of the power limit control (i.e., throttling control based on the power limit setting (THRM#)).

Thus the state transition condition 166 is a condition which, after the power limit control block enters the power limited state 153, requires that the power limit control timer 111 keep counting. While the state transition condition 166 is being met, the power limit control block makes a transition from the power limited state 153 to the power limited state 153 (i.e., the current state remains unchanged).

The state transition condition 167, on the other hand, is a condition requiring that the time limit control timer 111 terminate its counting. When the state transition condition 167 is met, the power limit control block makes a transition from the power limited state 153 to the normal state 151.

The count time of the power limit control timer 111 will be discussed later in more detail.

Figure 6:
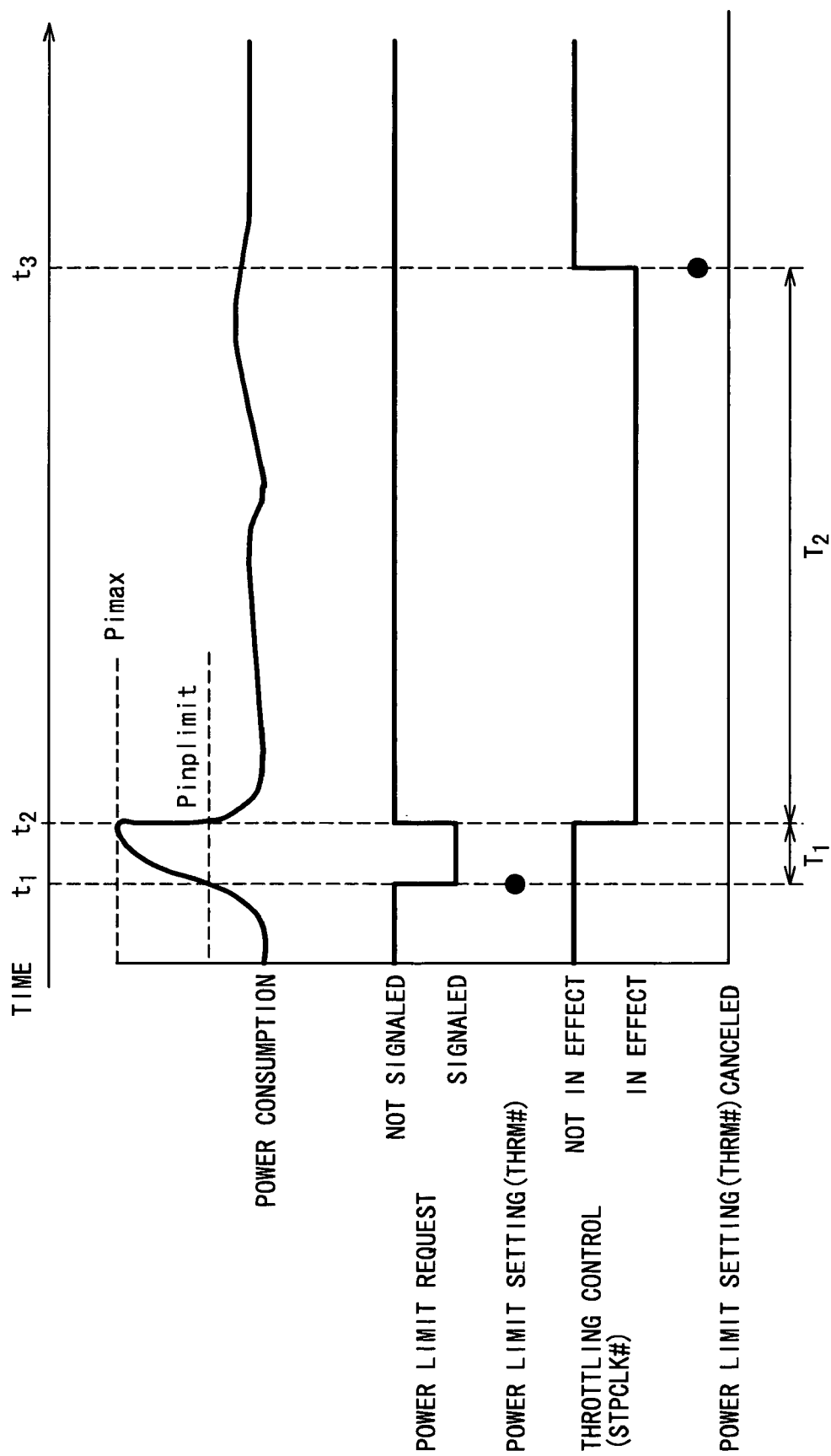
FIG. 6 is a timing chart indicating how the power limit control of the second stage typically takes place as part of the two-stage power limit control scheme executed by the power limit control block in FIG. 2.
Figure 7:
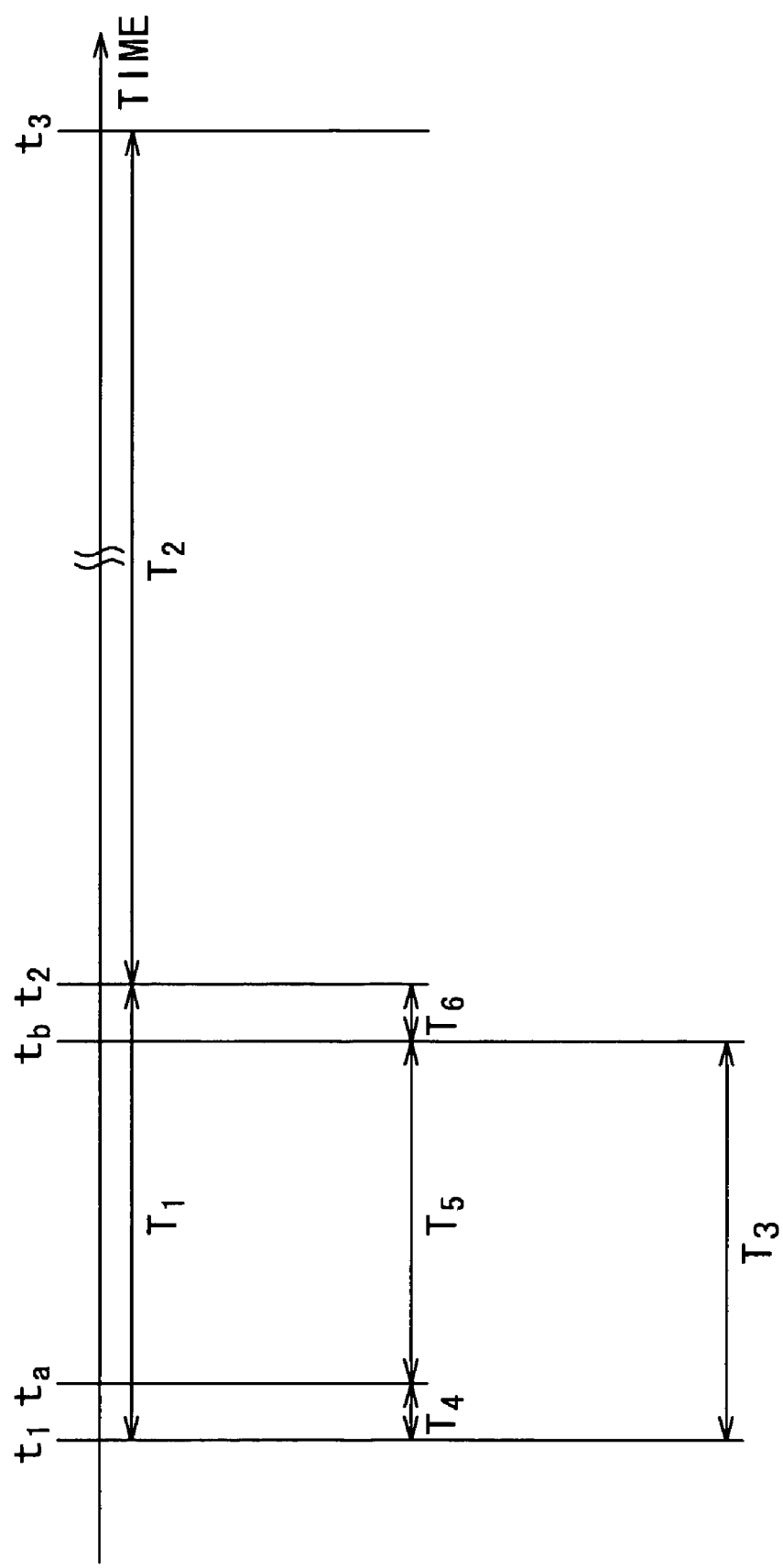
FIG. 7 is a timing chart sketching how the preliminary power limit control in the first stage typically takes place as part of the two-stage power limit control scheme executed by the power limit control block in FIG. 2.

Described below with reference to FIGS. 6 and 7 are: the count time of the power limit control timer 111, the count time of the preliminary power limit control timer 112, the duration of the power limit control, and the duration of the preliminary power limit control, in connection with the power limit control block (FIG. 2).

FIG. 6 is a timing chart for explaining the duration of the power limit control and the count, time of the power limit control timer 111. In other words, FIG. 6 is a timing chart in effect when the preliminary power limit control is not carried out (only the throttling control based on the power limit setting (THRM#) is executed).

In FIG. 6, the time axis is shown at the top of the chart. From the time axis down, the following are graphically illustrated: the power consumption of the system (the information processing apparatus 1 in FIG. 1 as a whole), the presence or absence of the power limit request from the poser monitoring unit 42, the power limit setting (THRM#) (the time at which the controller 40 writes "ON" to the register 103 through the signal line 71), the execution or inexecution of the throttling control (the presence or absence of STPCLK# output by the STPCLK# generation unit 101), and the cancellation of the power limit setting (THRM#) (the time at which the controller 40 writes "OFF" to the register 103 via the signal line 71).

In FIG. 6, "Pinplimit" denotes a power limit threshold (rated power for the power supply unit 41 in this case), and "Pimax" represents a peak power level rated for the power supply unit 41.

As shown in FIG. 6, it is assumed illustratively that the level of power consumption exceeds the power limit "Pinplimit" at a time t1. At that point in time, the power monitoring unit 42 detects the excess and outputs a power limit request to the controller 40 accordingly.

In the description that follows, the power limit request, STPCLK# and other signals may be said to be turned on or off when output or not output, respectively.

When the power limit request is turned on, the controller 40 sets the power limit setting (THRM#) to "ON." That is, the power limit setting (THRM#) is timed to be in effect when the power limit request is turned on (at about time t1 in the example of FIG. 6).

The south bridge 18 outputs STPCLK# to the throttling control unit 84 of the CPU 11 via the signal line 72 at a time t2, upon elapse of a delay time T1 after the power limit setting (THRM#) is set to "ON" (count time of the timer 104, illustratively two seconds specified for the south bridge 18 from Intel Corporation) On detecting the signal STPCLK#, the throttling control unit 84 starts executing the throttling control. The throttling control is maintained as long as the signal STPCLK# is being detected. In other words, when the signal STPCLK# is turned on (at time t2 in FIG. 6), the throttling control is initiated. While the signal STPCLK# is being on, the throttling control remains in effect.

As described, the throttling control (power limit control) is started as per the power limit setting (THRM#) at the time t2 upon elapse of the delay time T1 following the time t1 at which the power consumption of the system (information processing apparatus 1) exceeded the power limit "Pinplimit" (to be precise, following the time at which the power limit setting (THRM#) was set to "ON" and the timer 104 started its counting). In other words, if the preliminary power limit control is not carried out, an uncontrolled state emerges (where the throttling control is not performed as per the power limit setting (THRM#)) between the time t1 and the time t2. That means the power consumption of the system (information processing apparatus 1) can stay above the power limit "Pinplimit" for some time.

However, the rated voltage (i.e., power limit "Pinplimit") stipulated in the design specification of the power supply unit 41 is restricted by the heating of the unit 41. For that reason, the power consumption is managed not in accordance with instantaneous values of power consumption but on the basis of a mean power level over a fixed time period. That is, even if the level of power consumption momentarily exceeds the power limit "Pinplimit," the phenomenon is considered to fall within tolerance of the design specification for the power supply unit 41 as long as the mean power level between the rated peak power "Pimax" and the duty rate remains below the power limit "Pinplimit."

It follows that the design specification of the power supply unit 41 is met if the throttling control (power limit control) is continued based on the power limit setting (THRM#) during the time T2, i.e., a time period during which the consumed power falls within the rated power. The time period T2 is established in accordance with the time period T1 during which the power consumption may exceed the rated power (power limit "Pinplimit"), and on the basis of the duty rate (i.e., the rate of the time during which the consumed power remains within the rated power, to the time during which the consumed power exceeds the rated power). That is, with the throttling control continued, the mean power during the times T1 and T2 combined (i.e., heating value of the power supply unit 41) remains below the power limit "Pinplimit" which is the rated power.

More specifically, if the duty rate is 10 percent (i.e., the ratio of the time during which the consumed power remains within the rated power to the time during which the consumed power exceeds the rated power is 9 to 1), if the delay time T1 is two seconds (applicable to the south bridge 18 from Intel Corporation), and if the peak power "Pimax" continues during the delay time T1 (two seconds), then the time period T2 during which the power limit control should be maintained (called the power limit continuation time T2) is at least nine times the delay time T2, i.e., 18 seconds (=9×T1=9×2 sec.) or longer.

The power limit continuation time T2 may be used illustratively as the count time of the power limit control timer 111 for the controller 40. (It should be noted, as will be discussed later, that the count time of the power limit control timer 111 is not limited to the power limit continuation time T2.) In this case, the power limit control timer 111 starts counting at the time t2 at which the power limit request is turned off, keeps counting during the power limit continuation time T2, and terminates the counting operation at a time t3, i.e., at the end of the power limit continuation time T2. The time t3, upon elapse of the power limit continuation time T2 following the time t2, is the time at which to cancel the power limit setting (THRM#).

At the time t3 (after the power limit control timer 111 has counted the power limit continuation time T2), the controller 40 signals cancellation of the power limit control to the south bridge 18 over the signal line 71, whereby the power limit setting (THRM#) is set to "OFF." This causes the south bridge 18 to stop outputting STPCLK#. On detecting the absence of the signal STPCLK#, the throttling control unit 84 stops the throttling control. That is, when the signal STPCLK# is turned off (at time t3 in the example of FIG. 6), the throttling control (power limit control) based on the power limit setting (THRM#) is brought to an end.

FIG. 7 is a timing chart for explaining the duration of the preliminary power limit control and the count time of the preliminary power limit control timer 112.

In FIG. 7, the horizontal line represents the time axis, the same as that in FIG. 6. On this time axis, a time t1 stands for the time at which the power limit request is turned on; a time t2 denotes the time at which the power limit control (throttling control based on the power limit setting (THRM#)) is started; and a time t3 represents the time at which the power limit control is terminated.

Since the preliminary power limit control and the power limit control are not allowed to take place concurrently as mentioned above, the preliminary power limit control needs to end before the start of the power limit control. That is, the preliminary power limit control is to be executed between the time t1 and the time t2.

The preliminary power limit control is thus terminated at a time tb, with a time period T6 allowed in before the time t2 at which the power limit control is to be started, as shown in FIG. 7. The allowed time T6 may not be restricted to a specific period of time, but may be set illustratively to 0.2 seconds for this example.

As a result, the preliminary power limit control lasts during the time period T3. In this case, the time period T3 is given as 1.8 seconds (T3=T1−T6=2−0.2 sec.).

It should be noted that if the mean power level between the rated peak power "Pimax" and the duty rate does not exceed the power limit "Pinplimit," then the design specification of the power supply unit 41 is considered to be complied with. Thus if the duty rate is set to 10 percent as in the case of FIG. 6, the design specification of the power supply unit 41 is complied with provided the preliminary power limit control is performed for a time period T5 which is at least 90 percent of the time period T3 (T5=T3×0.9=1.8× 0.9=1.62 sec. for this example).

In other words, what is only needed is that a time lag (delay time) from the time the controller 40 signals a preliminary power limit request to the AML 90 using an SCI at about the time t1 until the preliminary power limit control is actually started falls within a time period T4 which is 10 percent of the time period T3 (T4=T3×0.1=1.8×0.1=0.18 sec.). That is, the design specification of the power supply unit 41 is complied with if the preliminary power limit control is started between the time t1 and the time ta that is later than the time t1 by the time period T4.

The preliminary power limit control timer 112 starts counting at about the time t1 at which the preliminary power limit request (SCI) is signaled, and terminates the counting operation at the time tb at which the preliminary power limit control is scheduled to end. That means the time period T3 equals the count time of the preliminary power limit control timer 112.

The controller 40 monitors the count value on the timer 112 for preliminary power limit control, as described above. If an ongoing preliminary power limit acknowledgment is not output from the AML 41 past the time ta (i.e., after the preliminary power limit control timer 112 has counted the time period T4), the controller 40 determines that the preliminary power limit control has failed. That is, even if the preliminary power limit control is started past the time ta, it is difficult to ensure the duty rate. That means it is impossible to comply with the design specification of the power supply unit 41; hence the preliminary power limit control is considered a failure.

At the time tb (at which the preliminary power limit control timer 112 finishes counting the time period T3), the controller 40 determines whether or not the preliminary power limit control has succeeded on the basis of the presence or absence of a power limit request throughout the duration of the control (i.e., from the time the preliminary power limit control acknowledgment was detected until the time tb was reached).

Described below with reference to the flowcharts of FIGS. 8 through 11 is how control processing of the power limit control block in FIG. 2 takes place. More specifically, typical control processes performed successively by the controller 40 and AML 91 constituting a power limit setting unit in the power limit control block are to be described individually.

The steps making up the preliminary power limit control process to be described below are the same regardless of any one of the above-described control types being adopted for the preliminary power limit control. Illustratively, the throttling control is assumed to be implemented here for the preliminary power limit control.

The preliminary power limit control and the power limit control are not allowed to be executed simultaneously as mentioned earlier. The preliminary power limit control is to be followed by the power limit control.

The controller 40 carries out processing regarding the power limit control (called the power limiting process hereunder), a first process associated with the preliminary power limit control (called the preliminary power limiting process), and a second process associated with the preliminary power limit control (called the auxiliary process for preliminary power limit), each executed independently of the other two processes.

Figure 8:
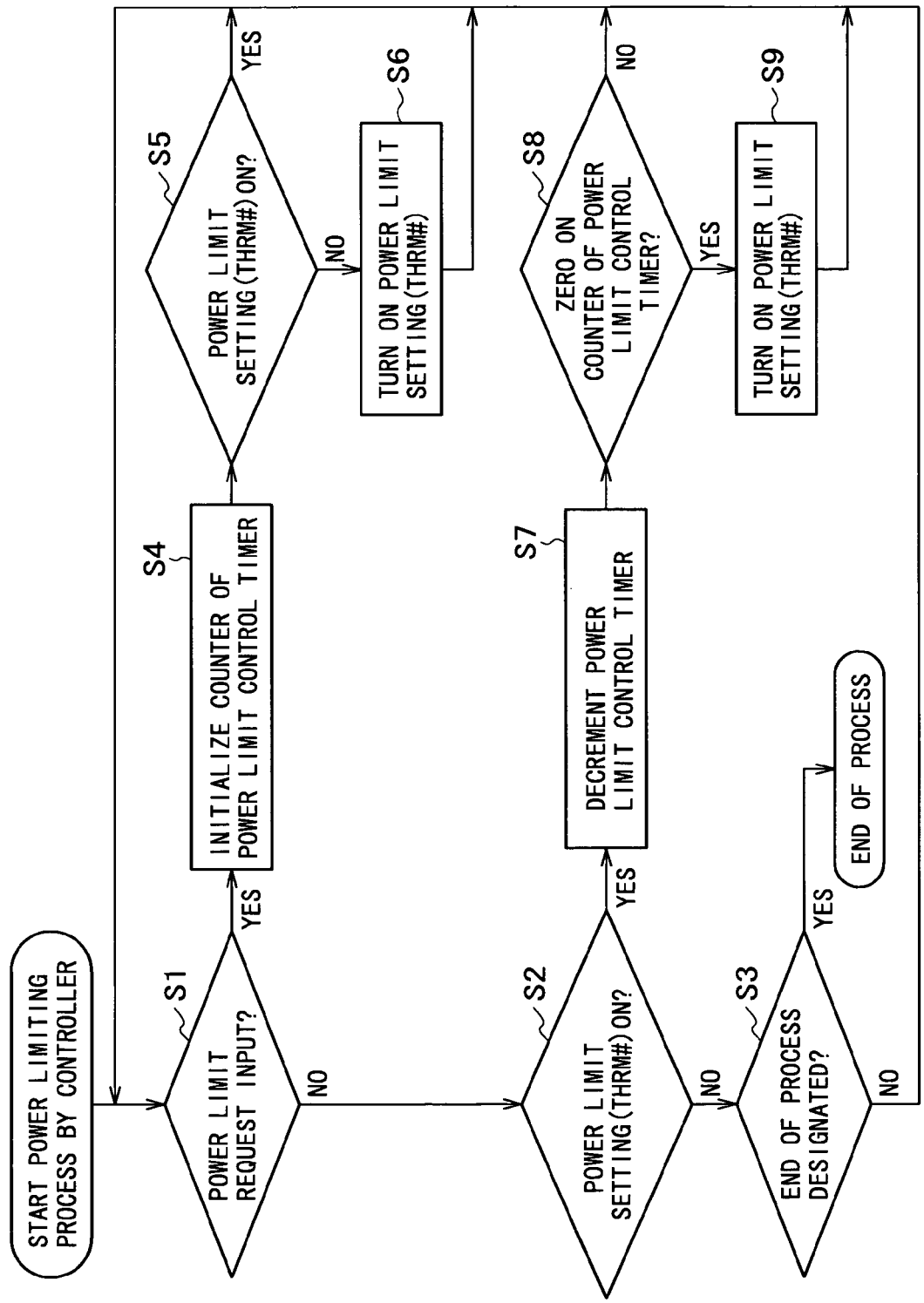
FIG. 8 is a flowchart of steps constituting a power limiting process performed by a controller in the power limit control block of FIG. 2.
Figure 9:
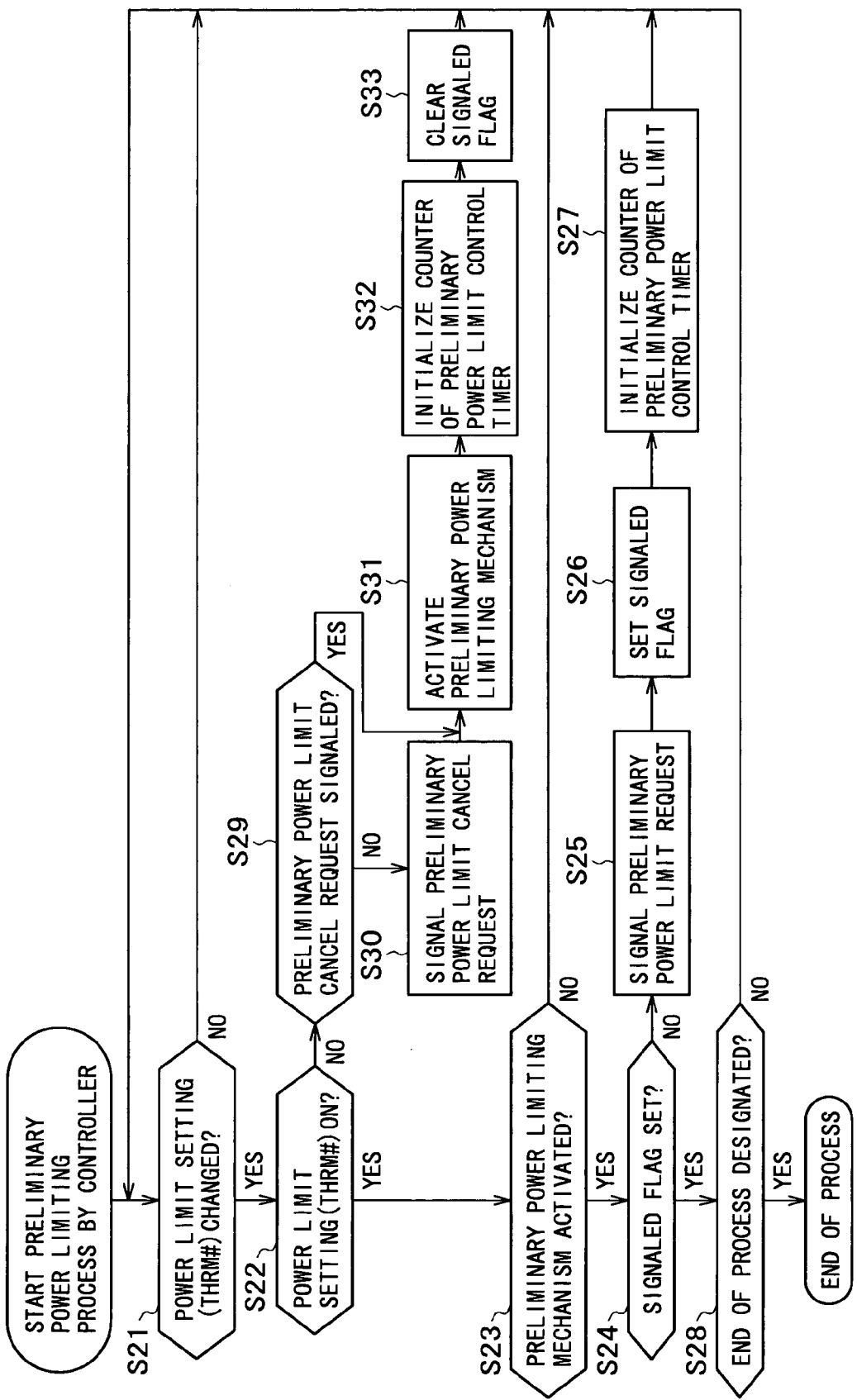
FIG. 9 is a flowchart of steps constituting a preliminary power limiting process carried out by the controller in the power limit control block of FIG. 2.
Figure 10:
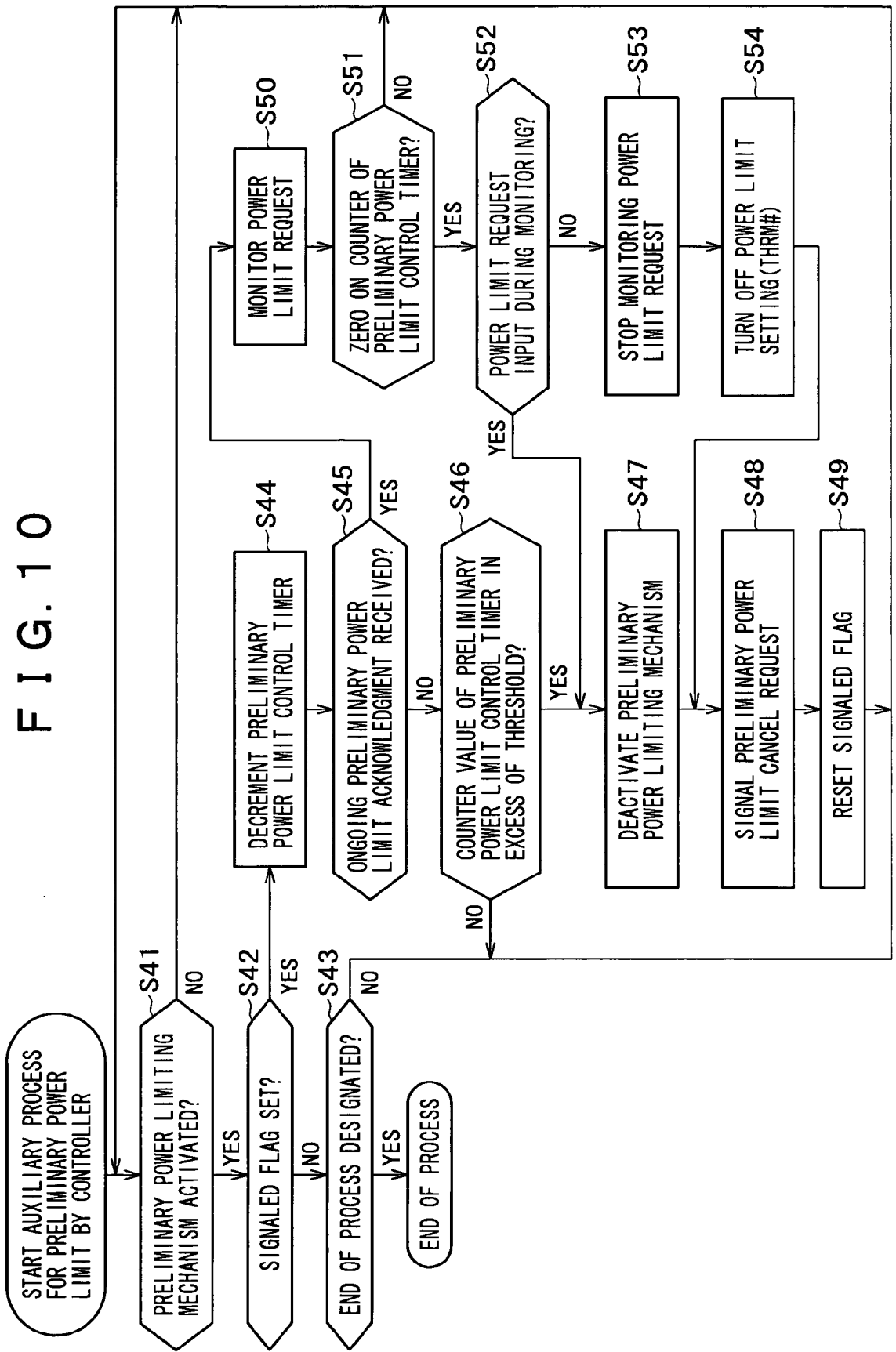
FIG. 10 is a flowchart of steps constituting an auxiliary process for preliminary power limit by the controller in the power limit control block of FIG. 2.

The foregoing three processes are outlined in the flowcharts of FIGS. 8 through 10, i.e., the power limiting process in FIG. 8, the preliminary power limiting process in FIG. 9, and the auxiliary process for preliminary power limit in FIG. 10.

The power limiting process, the preliminary power limiting process, and the auxiliary process for preliminary power limit, all performed by the controller 40, are described below individually and in the above order, with reference to the corresponding flowcharts of FIGS. 8 through 10.

First to be described is the power limiting process by the controller 40 in reference to the flowchart of FIG. 8.

In step S1, the controller 40 determines whether or not a power limit request is input from the power monitoring unit 42.

If in step S1 no power limit request is found to be input, the controller 40 goes to step S2. In step S2, the controller 40 determines whether or not the power limit setting (THRM#) is set to "ON." More specifically, the controller 40 checks to see whether or not "ON" has been written to the register 103 of the south bridge 18 over the signal line 71.

If in step S2 the power limit setting (THRM#) is not found to be on, i.e., if "ON" is not written in the register 103 of the south bridge 18, then the controller 40 reaches step S3. In step S3, the controller 40 determines whether or not an end of the process is designated.

If in step S3 an end of the process is found designated, the power limiting process is terminated.

If in step S3 the end of the process is not found to be designated, the controller 40 returns to step S1. The subsequent steps are then repeated.

That is, in the initial state (where "ON" is not written in the register 103 and an end of the process is not specifically designated), the controller 40 keeps monitoring what is output by the power monitoring unit 42.

When the power monitoring unit 42 outputs a power limit request (when a power limit request is found to be input in step S1), the controller 40 goes to step S4. In step S4, the controller 40 initializes the power limit control timer 111.

In step S5, the controller 40 determines whether or not the power limit setting (THRM#) is set to "ON."

Since "ON" is yet to be written to the register 103, the controller 40 in step S5 determines that the power limit setting (THRM#) is not turned on and goes to step S6. In step S6, the controller 40 turns on the power limit setting (THRM#). More specifically, the controller 40 writes "ON" to the register 103 via the signal line 71.

Control is then returned to step S1. In step S1, another check is made to see whether or not a power limit request is input.

With this embodiment, as mentioned above, the preliminary power limit control (throttling control based on the preliminary power limit setting in this case) is carried out until the throttling control according to the power limit setting (THRM#) (i.e., power limit control) is started.

However, it often happens that a power limit request is output before the start of the preliminary power limit control. In such a case, the power limit request is found to be input in step S1, and step S4 is reached and executed. In step S5 following step S4, another check is made to see whether or not the power limit setting (THRM#) is turned on. Since the power limit setting (THRM#) has already been set to "ON" in this example, the "ON" setting is detected in step S5 and thus control is returned to step S1.

That is, once the preliminary power limit control is started, steps S1, S4 and S5 are repeated until the power limit request is no longer output by the power monitoring unit 42.

When the power limit request is not found to be output by the power monitoring unit 42 as a result of the preliminary power limit control (i.e., when the power limit request is not found input in step S1), then step S2 is reached. In step S2, a check is made to determine whether or not the power limit setting (THRM#) is set to "ON."

In this example, the controller 40 in step S2 determines that the power limit setting (THRM#) is turned on. Step S2 is followed by step S7 in which the power limit control timer 111 is decremented.

In the foregoing description in connection with FIG. 7, it was shown that the count time of the power limit control timer 111 equaled the power limit continuation time T2 (18 seconds in the above case). The power limit control timer 111 was then shown starting its counting operation at the time t2 (i.e., the time at which the power limit control was actually started).

In the example of FIG. 8, by contrast, the power limit control timer 111 actually starts counting when step S7 is carried out for the first time. More specifically, if the preliminary power limit control has succeeded, the timer 111 starts its counting operation between the time t1 and the time ta (i.e., before the power limit control is started).

Thus when the controller 40 performs the power limiting process as per the flowchart in FIG. 8, the count time of the power limit control timer 11 may be set illustratively to the delay time T1 plus the power limit continuation time T2 (20 seconds after conversion to the above example). Consequently, where the power limit control is executed according to the flowchart in FIG. 8, the control (i.e., throttling control based on the power limit setting (THRM#)) is terminated at about the time t3 (at least not before the time t3). That means the design specification of the power supply control 41 can be complied with.

In step S8 of FIG. 8, the controller 40 determines whether or not the power limit control timer 111 has reached zero.

If the count value on the timer 111 is not found to be zero, control is returned to step S1 and the subsequent steps are again repeated.

During that time, the timer 104 in the south bridge 18 is performing its counting operation. At the end of the counting (upon elapse of two seconds for the south bridge 18 from Intel Corporation), the register 103 outputs a generation command to the STPCLK# generation unit 101. Given the generation command, the STPCLK# generation unit 101 generates STPCLK# and outputs the generated signal to the throttling control unit 84 over the signal line 72.

On detecting the signal STPCLK#, the throttling control unit 84 starts the throttling control. Thereafter, the STPCLK# generation unit 101 keeps outputting STPCLK#, so that the throttling control (power limit control) based on the power limit setting (THRM#) is continued.

When the count value on the power limit control timer 111 for the controller 40 reaches zero (i.e., when the power limit control timer counter is found to be zero in step S8), the controller 40 goes to step S9. In step S9, the controller 40 sets the power limit setting (THRM#) to "OFF." Specifically, the controller 40 writes "OFF" to the register 103 of the south bridge 18 via the signal line 71.

The register 103 then stops outputting the generation command, and the STPCLK# generation unit 101 stops outputting STPCLK# correspondingly. On detecting the absence of the output signal STPCLK#, the throttling control unit 84 stops the throttling control (power limit control) based on the power limit setting (THRM#).

At this point, control is returned to step S1 and the subsequent steps are repeated in the power limiting process of the controller 40. That is, the controller 40 repeats steps S1, S2 and S3 to monitor continuously the presence of a power limit request from the power monitoring unit 42.

The flowchart of FIG. 8 represents a typical power limiting process applicable to the setup in which the south bridge 18 is one from Intel Corporation. The south bridge 18 in this example is designed to output STPCLK# two seconds after the power limit setting (THRM#) is set to "ON" (i.e., after the timer 104 has counted two seconds). With that specification in effect, the controller 40 performs the power limiting process in FIG. 8 on the assumption that the preliminary power limit control is executed for two seconds before the start of the power limit control (throttling control based on the power limit setting (THRM#)).

A south bridge from a manufacturer other than Intel Corporation may output STPCLK# immediately (because the timer 104 is absent) when the power limit setting (THRM#) is set to "ON." If such a south bridge 18 is adopted in the setup of FIG. 2, then the process of the flowchart in FIG. 8 needs to be supplemented with another step.

That is, an additional step is inserted between step S5 and S6 to determine whether or not the preliminary power limit setting is turned on. If the preliminary power limit setting is found to be on, then step S1 is reached again. If the preliminary power limit setting is not found to be on (i.e., set to "OFF"), then control is passed on to step S6.

Described below with reference to the flowchart of FIG. 9 is the preliminary power limiting process by the controller 40.

In step S21, the controller 40 determines whether or not there is a change in the power limit setting (THRM#).

More specifically, if the current setting in the register 103 of the south bridge 18 is found unchanged (either "ON" or "OFF"), then no change is recognized in step S21 and control is looped back to step S21. Another check is then made to see if a change has occurred in the power limit setting (THRM#). The controller 40 thus monitors continuously the power limit setting (THRM#).

If a change from "OFF" to "ON" or from "ON" to "OFF" is detected in the register 103 of the south bridge 18 during the monitoring in step S21, it is interpreted to signify a change in the power limit setting (THRM#). This means that in step S21, the controller 40 has recognized its own switch from "ON" to "OFF" or vice versa in the power limit setting (THRM#) during the power limiting process or the auxiliary process for preliminary power limit, carried out independently of the preliminary power limiting process (in step S6 or S9 of FIG. 8 discussed above, or in step S54 of FIG. 10 to be described later).

On determining that the power limit setting (THRM#) is changed in step S21, the controller 40 goes to step S22. In step S22, the controller 40 determines whether or not the power limit setting (THRM#) is set to "ON."

More specifically, if the power limit setting (THRM#) has been switched from "ON" to "OFF," that means the "ON" setting is not found in step S22. In that case, control is passed on to step S29. Step S29 and subsequent steps will be discussed later.

If the power limit setting (THRM#) has been switched from "OFF" to "ON," the OFF-to-ON change is detected in step S22. In that case, the controller 40 reaches step S23 and determines whether or not a preliminary power limiting mechanism is activated.

The preliminary power limiting mechanism refers to that part of the power limit control block in FIG. 2 which takes over the preliminary power limit control (in particular, AML 91 as part of the power limit setting unit). By the same token, that part of the power limit control block which effects the power limit control is called a power limiting mechanism.

In this context, where the preliminary power limiting mechanism is in a state of readiness to execute the preliminary power limit control, the preliminary power limiting mechanism is said to be activated. Where the preliminary power limiting mechanism is not in a state of readiness to execute the preliminary power limit control, the preliminary power limiting mechanism is said to be deactivated.

In other words, when the controller 40 activates the preliminary power limiting mechanism, that means the controller 40 has found the preliminary power limiting mechanism capable of executing the preliminary power limit control and allows the mechanism to effect the control (e.g., by signaling a preliminary power limit request to the AML 91 using an SCI). When the controller 40 deactivates the preliminary power limiting mechanism, that means the controller 40 has found the preliminary power limiting mechanism incapable of executing the preliminary power limit control and thus inhibits the mechanism from carrying out the control.

When to activate and to deactivate the preliminary power limiting mechanism will be discussed later in more specific terms.

If in step S23 the preliminary power limiting mechanism is not found to be activated (i.e., remaining in a deactivated state), control is returned to step S21. Step S21 and subsequent steps are then repeated.

If in step S23 the preliminary power limiting mechanism is found to be activated, the controller 40 goes to step S24. In step S24, the controller 40 determines whether or not a signaled flag is being set.

The signaled flag is a flag indicating that the controller 40 has signaled a preliminary power limit request to the AML 91 using an SCI. When to set the signaled flag and when to clear it will be discussed later.

If in step S24 the signaled flag is yet to be set, step S25 is reached. Step S25 and subsequent steps will be described later.

If in step S24 the signaled flag is found to be set, the controller 40 goes to step S28. In step S28, the controller 40 determines whether or not an end of the process is designated.

If in step S28 the end of the process is found to be designated, the preliminary power limiting process is brought to an end.

If the end of the process is not found to be designated in step S28, control is returned to step S21 and the subsequent steps are repeated.

What follows is a description of the remaining steps to be discussed of the preliminary power limiting process by the controller 40, along with each of two more cases: when the power limit setting (THRM#) is changed from "OFF" to "ON," and when the setting is changed from "ON" to "OFF."

First to be described is how the preliminary power limiting process is performed by the controller 40 in the event of a changed from "OFF" to "ON" in the power limit setting (THRM#).

In this case, as mentioned above, a change is detected in step S21, and the detected change is found to be an OFF-to-ON change in step S22. In step S23 following step S22, a check is made to determine whether or not the preliminary power limiting mechanism is being activated.

If in step S23 the preliminary power limiting mechanism is found to be activated, step S24 is reached. In step S24, as described above, a check is made to determine whether or not the signaled flag is being set.

Since a preliminary power limit request (SCI) has yet to be signaled in this setup, the controller 40 in step 24 determines that the signaled flag is not set. Step S24 is then followed by step S25 in which the preliminary power limit request is signaled to the AML 91 by use of an SCI.

In step S26, the controller 40 sets the signaled flag. In step S27, the controller 40 initializes the counter of the preliminary power limit control timer 112. Thereafter, control is returned to step S21 and the subsequent steps are repeated.

At this time, as will be described later, the AML 91 finds that a request has been signaled from the controller 40 using the SCI and that the signal is a preliminary power limit request (in steps S62 and S64 of FIG. 11). The AML 91 then establishes the preliminary power limit control. Since the throttling control is currently in effect as the preliminary power limit control for this example, the AML 91 writes "ON" to the register 102 of the south bridge 18 (in step S65 of FIG. 11).

Almost instantaneously, the register 102 outputs a generation command to the STPCLK# generation unit 101. Given the generation command, the STPCLK# generation unit 101 generates STPCLK# and outputs the generated signal to the throttling control unit 84 over the signal line 72. On detecting the signal STPCLK#, the throttling control unit 84 starts executing the throttling control. That is, the throttling control is carried out as the preliminary power limit control.

The AML 91 waits for the preliminary power limit control to be started (i.e., the AML awaits the start for a predetermined time period). When the preliminary power limit control is found to be started, the AML 91 signals an ongoing preliminary power limit acknowledgment to the controller 40 (in steps S66 and S67 of FIG. 11).

The handling by the controller 40 of the ongoing preliminary power limit acknowledgment is part of the auxiliary process for preliminary power limit and thus will be discussed later with reference to the flowchart of FIG. 10.

Described below are the steps constituting the preliminary power limiting process carried out by the controller 40 in the event of an ON-to-OFF change in the power limit setting (THRM#).

In step S21 of this process, as described above, a change is detected in step S21, and the detected change is found to be an ON-to-OFF change in step S22. Step S22 is then followed by step S29.

In step S29, the controller 40 determines whether or not a preliminary power limit cancel request (SCI) has been signaled to the AML 91.

If in step S29 the preliminary power limit cancel request (SCI) is not found to be signaled yet, the controller 40 reaches step S30 and signals the request to the AML 91 using an SCI. From step S30, control is passed on to step S31.

At this point, as will be described later, the AML 91 determines that a request has been signaled from the controller 40 using an SCI and that the signaled request is not a preliminary power limit request but a preliminary power limit cancel request (in steps S62, S64 and S68 of FIG. 11). The AML 91 cancels the preliminary power limit control accordingly. In this case, the throttling control, being set as the preliminary power limit control, is canceled by the AML 91 when the latter writes "OFF" to the register 102 of the south bridge 18 (in step S69 of FIG. 11).

In turn, the register 102 stops outputting the generation command, and the STPCLK# generation unit 101 stops outputting STPCLK# correspondingly. On detecting the absence of the output signal STPCLK#, the throttling control unit 84 stops the throttling control that was in effect as the preliminary power limit control.

By contrast, if the preliminary power limit cancel request (SCI) has already been signaled (i.e., if in step S29 the cancel request is found to have been signaled), step S30 is skipped and step S31 is reached.

In step S31, the controller 40 activates the preliminary power limiting mechanism. In step S32, the controller 40 initializes the counter of the preliminary power limit control timer 112. In step S33, the controller 40 clears the signaled flag. Control is then returned to step S21, and the subsequent steps are repeated.

Described below with reference to the flowchart of FIG. 10 is how the auxiliary process for preliminary power limit is carried out by the controller 40.

In step S41, the controller 40 determines whether or not the preliminary power limiting mechanism is being activated.

If in step S41 the preliminary power limiting mechanism is not found to be activated, control is returned to step S41 and the same check is repeated. The controller 40 thus monitors continuously activation of the preliminary power limiting mechanism.

In other words, the auxiliary control for preliminary power limit is executed only if the preliminary power limiting mechanism is being activated.

If in step S41 the preliminary power limiting mechanism is found to be activated, step S42 is reached. In step S42, the controller 40 determines whether or not the signaled flag has been set, i.e., whether or not the preliminary power limit request (SCI) has already been signaled.

If in step S42 the signaled flag is not found to be set, step S43 is reached. In step S43, the controller 40 determines whether or not an end of the process is designated.

If in step S43 the end of the process is found to be designated, then the auxiliary process for preliminary power limit is terminated.

If in step S43 the end of the process is not found to be designated, control is returned to step S41 and the subsequent steps are repeated. That is, steps S41, S42 and S43 are repeated until the preliminary power limit request (SCI) is signaled (i.e., until the signaled flag is set).

When the preliminary power limit request (SCI) is signaled, the signaled flag is set (in steps S25 and S26 of FIG. 9). In this case, the controller 40 in step S42 determines that the signaled flag has been set. In step S44, the controller 40 decrements the preliminary power limit control timer 112. More specifically, the timer 112 starts counting at a point in time at which the preliminary power limit request (SCI) is signaled (at about the time t1 in the example of FIG. 7).

In step S45, the controller 40 determines whether or not an ongoing preliminary power limit acknowledgment has arrived.

If the acknowledgment is not found to have arrived in step S45, step S46 is reached. In step S46, the controller 40 determines whether or not the counter of the preliminary power limit control timer 112 has exceeded a predetermined threshold value.

Illustratively, the threshold value may be set to correspond with the time period T4 in FIG. 7. That is, if the AML 91 is in the normal state, the ongoing preliminary power limit acknowledgment should arrive before the time period T4 elapses following the signaling of the preliminary power limit control (SCI). Past the time period T4 (after the time ta), activation of the preliminary power limit control does not ensure the duty rate (e.g., the ratio of time period T4 to time period T3 in the example of FIG. 7) and the design specification of the power supply unit 41 cannot be complied with. In this case, the preliminary power limit control is considered to have failed.

With the threshold value arranged to correspond with the time period T4 in FIG. 7, the controller 40 can determine whether or not the preliminary power limit control is successful by checking to see if the counter value of the preliminary power limit control timer 112 has exceeded the threshold.

If in step S46 the counter value of the preliminary power limit control timer 112 is not found to have exceeded the threshold, then control is returned to step S41 and the subsequent steps are repeated. That is, even if an ongoing preliminary power limit control acknowledgment has failed to arrive, the controller 40 does not consider the preliminary power limit control to be unsuccessful until after the elapse of the time period corresponding to the threshold. During that time period, the controller 40 waits for the ongoing preliminary power limit control acknowledgment to come in.

If in step S46 the counter value of the preliminary power limit control timer 112 is found to have exceeded the threshold, the controller 40 regards the preliminary power limit control as unsuccessful. In that case, the controller 40 goes to step S47 and deactivates the preliminary power limiting mechanism. That is, the controller 40 attributes the inability of the AML 91 to signal an ongoing preliminary power limit acknowledgment to the assumption that the preliminary power limiting mechanism including the AML 91 is not in a state of readiness to execute the preliminary power limit control. Hence the deactivation by the controller 40 of the preliminary power limiting mechanism.

In step S48, the controller 40 signals a preliminary power limit cancel request to the AML 91 using an SCI. In step S49, the controller 40 clears the signaled flag. Control is then returned to step S41 and the subsequent steps are repeated.

Described above was the special case in which the AML 91 does not output the ongoing preliminary power limit acknowledgment. Normally, however, there will be no elapse of time corresponding to the threshold value used in step S46 (time period T4 in the example of FIG. 7), from the time the controller 40 signals the preliminary power limit request (SCI) to the AML 91 until the ongoing preliminary power limit acknowledgment output by the AML 91 reaches the controller 40.

Generally, the controller 40 detects the ongoing preliminary power limit acknowledgment from the AML 91 before the counter value of the preliminary power limit control timer 112 exceeds the threshold (i.e., arrival of the ongoing preliminary power limit acknowledgment is detected in step S45). In step S50, the controller 40 starts monitoring the presence of a power limit request coming from the power monitoring unit 42.

In step S51, the controller 40 determines whether or not the counter value of the preliminary power limit control timer 112 has reached zero.

If in step S51 the counter value of the timer 112 is not found to be zero, control is returned to step S41 and the subsequent steps are repeated. In other words, steps S41, S42, S44, S45, S50 and S51 are repeated until the counter of the timer 112 reaches zero (until the count corresponding to the time period T3 in the example of FIG. 7 ends). More specifically, the counter of the preliminary power limit control timer 112 is decremented and the presence of the power limit request is monitored.

When the counter of the preliminary power limit control timer 112 reaches zero (i.e., when the counter of the timer 112 is found to have reached zero in step S51), the controller 40 goes to step S52. In step S52, the controller 40 determines whether or not a power limit request has been input during the monitoring.

If even a single power limit request is found to have been input (i.e., if in step S52 at least one power limit request is found to have arrived during the monitoring), then the controller 40 considers the ongoing preliminary power limit control unsuccessful. In this case, the controller 40 proceeds to perform step S47 and the subsequent steps discussed above.

On the other hand, if no power limit request is found to have been input during the monitoring (i.e., if in step S52 no power limit request is found to have arrived during the monitoring), then the controller 40 considers the ongoing preliminary power limit control to be successful. In this case, the controller 40 goes to step S53 and terminates the monitoring of the power limit request. In step S54, the controller 40 sets the power limit setting (THRM#) to "OFF." Thereafter, step S48 and the subsequent steps discussed above are carried out.

If the power consumption of the system (information processing apparatus 1 in FIG. 1) is successfully limited under the preliminary power limit control, then no further control is necessary. Thus when the controller 40 regards the ongoing preliminary power limit control as successful, the controller 40 cancels the power limit control (throttling control based on the power limit setting (THRM#)) before it is started.

Described so far were the power limiting process, preliminary power limiting process, and auxiliary process for preliminary power limit carried out by the controller 40.

Figure 11:
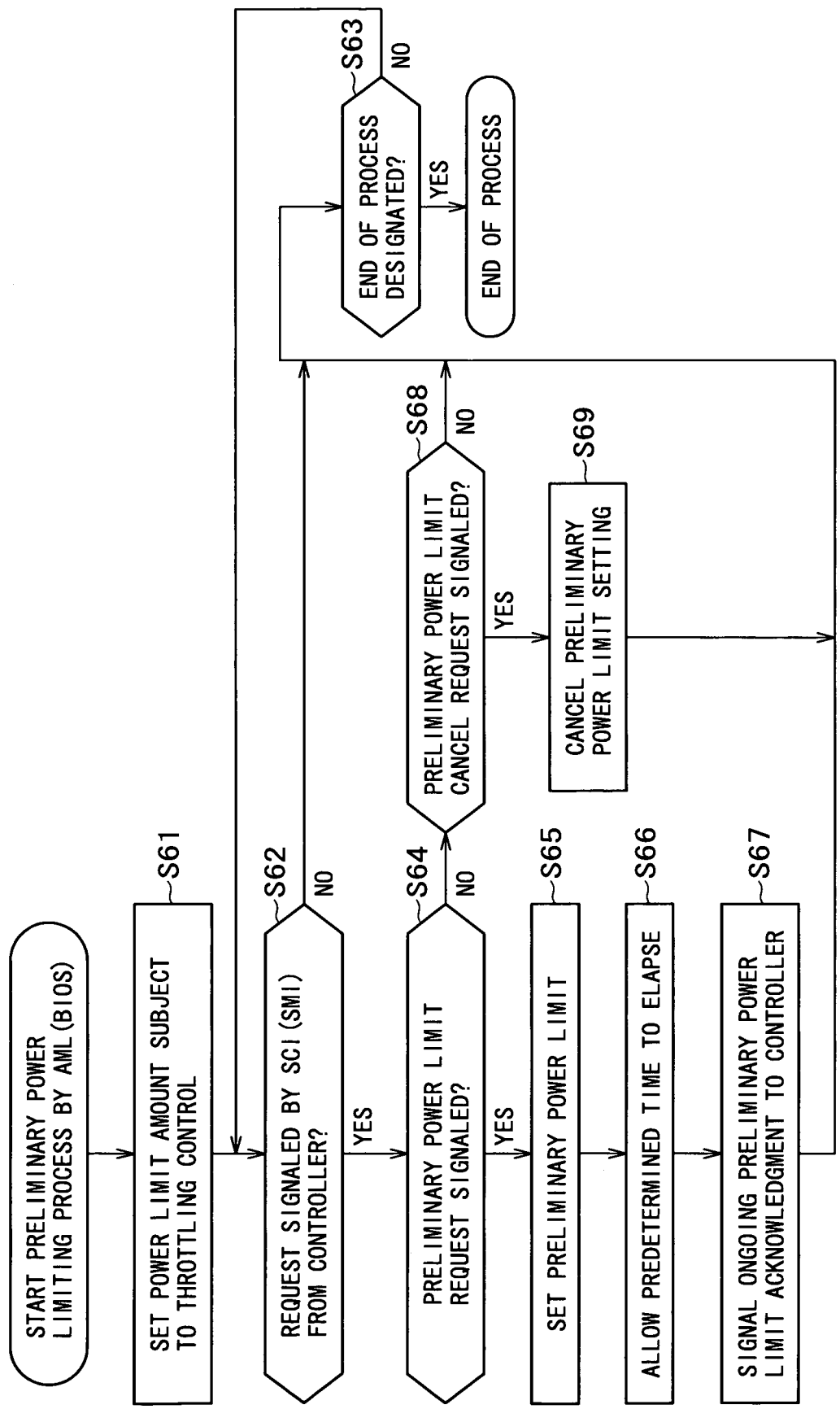
FIG. 11 is a flowchart of steps constituting a preliminary power limiting process performed by AML (or by BIOS) in the power limit control block of FIG. 2.

What follows is a description, with reference to the flowchart of FIG. 11, of how the AML 91 performs its preliminary power limiting process in conjunction with the above processes executed by the controller 40.

In the flowchart of FIG. 11, the topmost block says "START PRELIMINARY POWER LIMITING PROCESS BY AML (BIOS)" because, under the preliminary power limit control, the power limit setting unit is implemented by the AML 91 in the ACPI environment and by BIOS 30 (FIG. 1) in the non-ACPI environment as discussed earlier. In the non-ACPI environment, the BIOS 30 can execute the preliminary power limiting process as per the flowchart of FIG. 11 in exactly the same way as the AML 91 in the ACPI environment.

It should be noted that if the BIOS 30 functions as the power limit setting unit, then the SCI is replaced by the SMI as mentioned above. That is why the block of step S62 says "REQUEST SIGNALED BY SCI (SMI) FROM CONTROLLER?."

In step S61, the AML 91 sets a power limit amount subject to the throttling control. That is, although not shown in FIG. 2, the AML 91 is capable of establishing control amounts under the throttling control executed by the throttling control unit 84. The AML 91 thus sets a power limit amount for the throttling control unit 84 before the throttling control is started.

In step S62, the AML 91 determines whether or not a request has been signaled from the controller 40 using an SCI (SMI).

If the request (SCI (SMI)) is not found to be signaled from the controller 40 in step S62, the AML 91 goes to step S63. In step S63, the AML 91 determines whether or not an end of the process is designated.

If in step S63 the end of the process is found to be designated, the preliminary power limiting process is brought to an end.

If the end of the process is not found to be designated in step S63, control is returned to step S62 and the subsequent processing is repeated. More specifically, the AML 91 keeps monitoring the request that may be signaled from the controller 40 using an SCI.

When the request (SCI) is signaled from the controller 40 (if the request is found to be signaled from the controller 40 using an SCI (SMI) in step S62), the AML 91 reaches step S64. In step S64, the AML 91 determines whether or not the signaled request is a preliminary power limit request.

If in step S64 the signaled request is found to be a preliminary power limit request, the AML 91 goes to step S65. In step S65, the AML 91 sets the preliminary power limit. Since the throttling control is currently established as the preliminary power limit control, the AML 91 writes "ON" to the register 102 of the south bridge 18 whereby the preliminary power limit setting is turned on.

Almost instantaneously, the register 102 outputs a generation command to the STPCLK# generation unit 101. Given the generation command, the STPCLK# generation unit 101 generates STPCLK# and outputs the generated signal to the throttling control unit 84 over the signal line 72. On detecting the signal STPCLK#, the throttling control unit 84 starts executing the throttling control. That is, the throttling control is carried out as the preliminary power limit control.

At this point, the AML 91 reaches step S66 and waits for a predetermined time period to elapse. In step S67, the AML 91 signals an ongoing preliminary power limit acknowledgment to the controller 40. Thereafter step S63 and the subsequent steps described above are carried out.

That is, the AML 91 allows the predetermined time period to elapse before the preliminary power limit control is actually started. Once the control is started, the AML 91 signals the ongoing preliminary power limit acknowledgment to the controller 40.

More specifically, as discussed above, the controller 40 starts monitoring the output state of the power monitoring unit 42 (i.e., checks the presence of a power limit request) taking as a trigger the arrival of an ongoing preliminary power limit acknowledgment (in steps S45 and S50 in FIG. 10). If even a single power limit request is detected during the monitoring ("YES" in the check of step S52 in FIG. 10), then the controller 40 regards the preliminary power limit control currently underway as unsuccessful.

Thus if the ongoing preliminary power limit acknowledgment is output before the start of the preliminary power limit control, the controller 40 starts monitoring the presence of a power limit request from the power monitoring unit 42 even though the preliminary power limit control has yet to be started. As a result, immediately after starting to monitor the power limit request, the controller 40 determines that a power limit request has been signaled. This can lead the controller 40 incorrectly to conclude that the preliminary power limit control has failed where in fact the control has been successful.

That eventuality can be bypassed by the AML 91 when it waits for the predetermined time period to elapse before the preliminary power limit control is started unfailingly. With the preliminary power limit control started, the AML 91 signals the ongoing preliminary power limit acknowledgment to the controller 40.

If in step S64 the signaled request is not found to be the preliminary power limit request, the AML 91 goes to step S68. In step S68, the AML 91 determines whether or not the signaled request is a preliminary power limit cancel request.

If In step S68 the signaled request is not found to be a preliminary power limit cancel request, then step S63 and the subsequent steps discussed above are repeated.

If the signaled request is found to be the preliminary power limit cancel request in step S68, the AML 91 reaches step S69 and cancels the preliminary power limit control. Thereafter, step S63 and the subsequent steps are carried out as described above. Since the throttling control is currently established as the preliminary power limit control, the AML 91 writes "OFF" to the register 102 of the south bridge 18.

Almost immediately, the register 102 stops outputting the generation command, and the STPCLK# generation unit 101 stops outputting STPCLK# correspondingly. On detecting the absence of the output signal STPCLK#, the throttling control unit 84 stops the throttling control that was in effect as the preliminary power limit control.

Described below with reference to FIGS. 12 through 19 are four typical cases in which the power limit control block of FIG. 2 functions.

Figure 12:
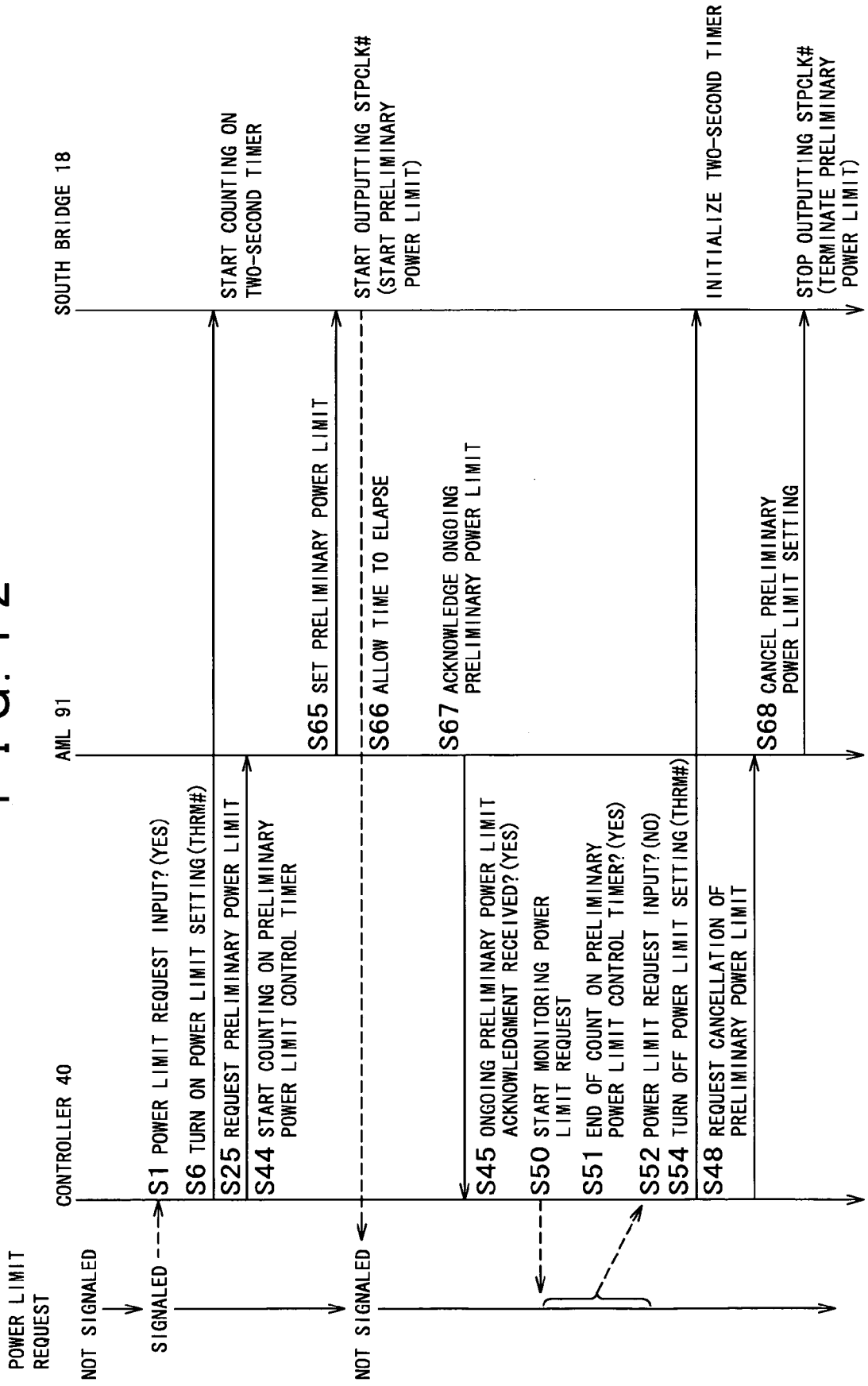
FIG. 12 is an arrow diagram showing a first case of processing relations between the controller, AML (or BIOS), and a south bridge in the power limit control block of FIG. 2.
Figure 13:
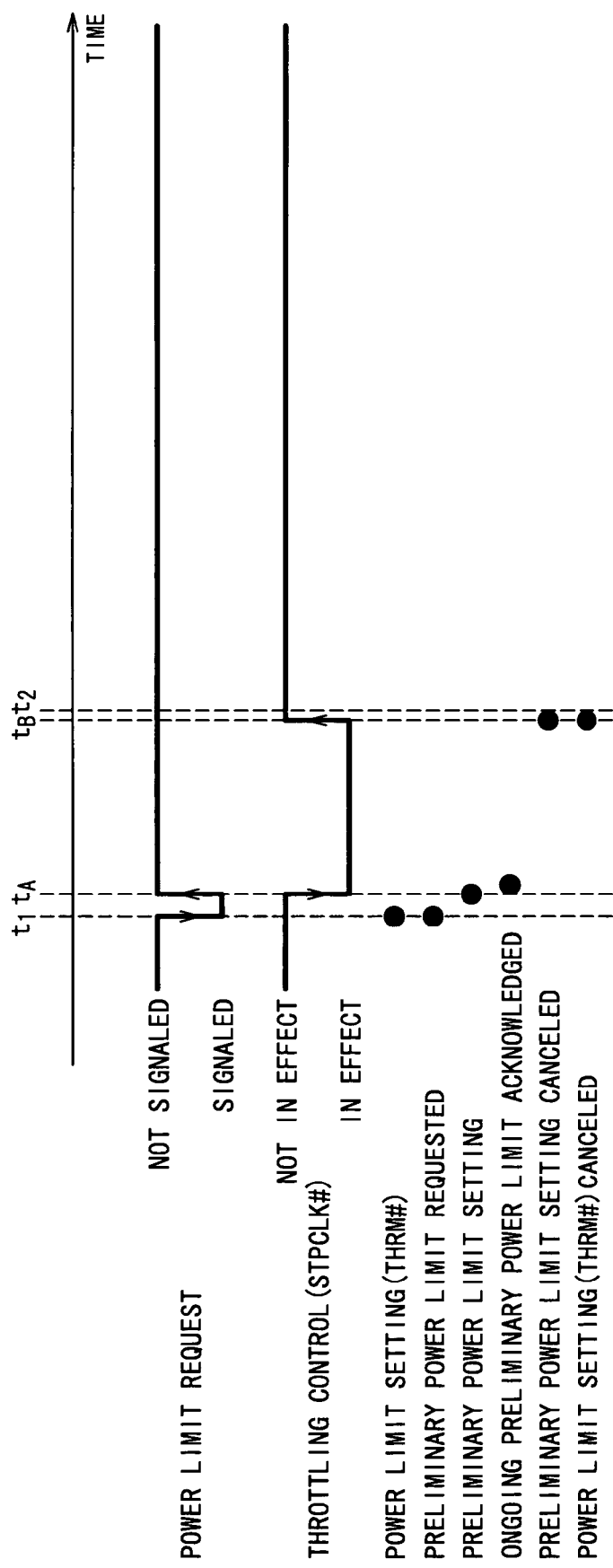
FIG. 13 is a timing chart applicable to the processing of the first case shown in the arrow diagram of FIG. 12.

FIG. 12 is an arrow diagram showing how the controller 40, AML 91, and south bridge 18 are related to one another during their processing in what is called the first case where the preliminary power limit control is successful. FIG. 13 is a timing chart applicable to the first case.

Figure 14:
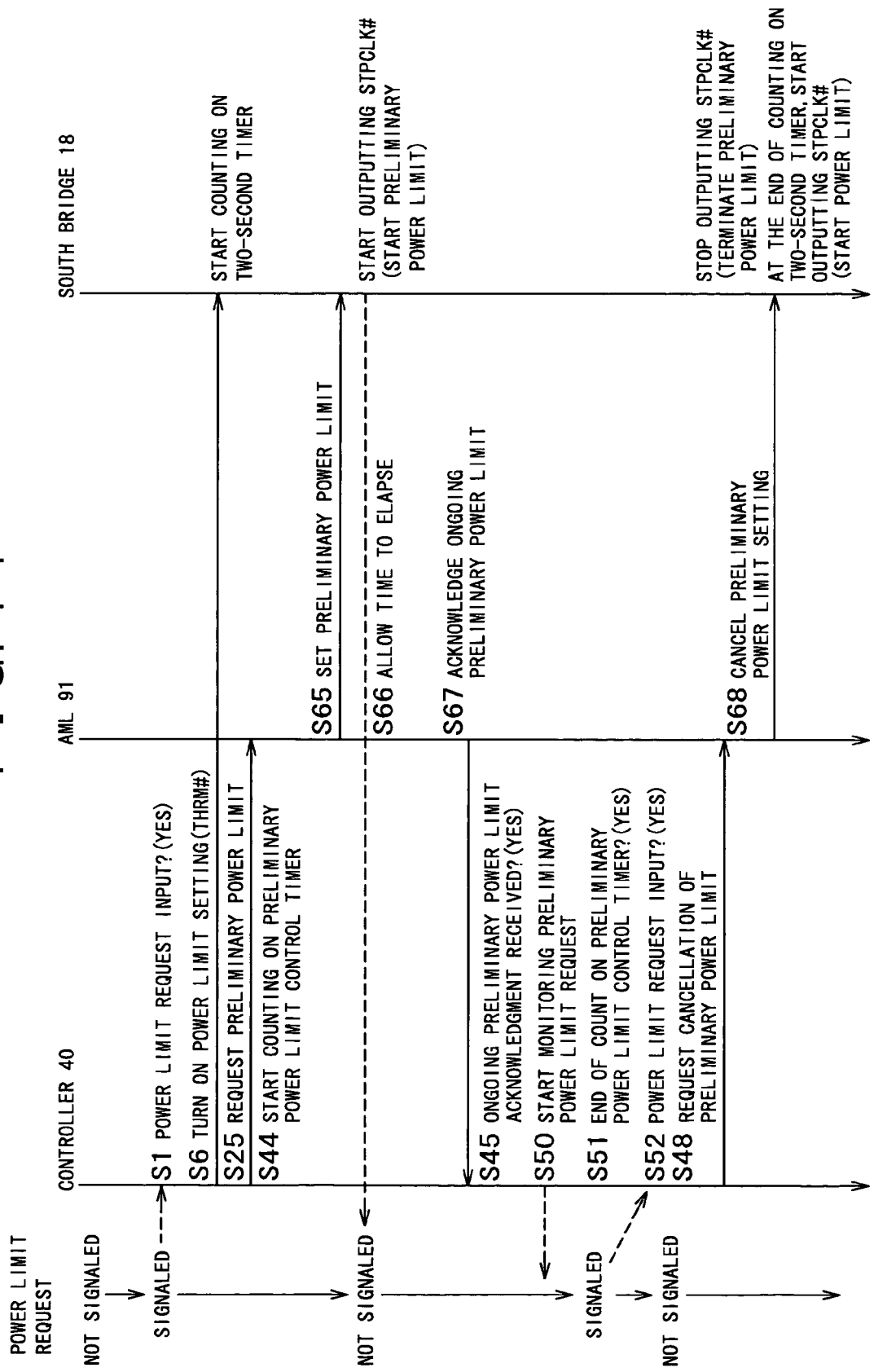
FIG. 14 is an arrow diagram depicting a second case of processing relations between the controller, AML (or BIOS), and the south bridge in the power limit control block of FIG. 2.
Figure 15:
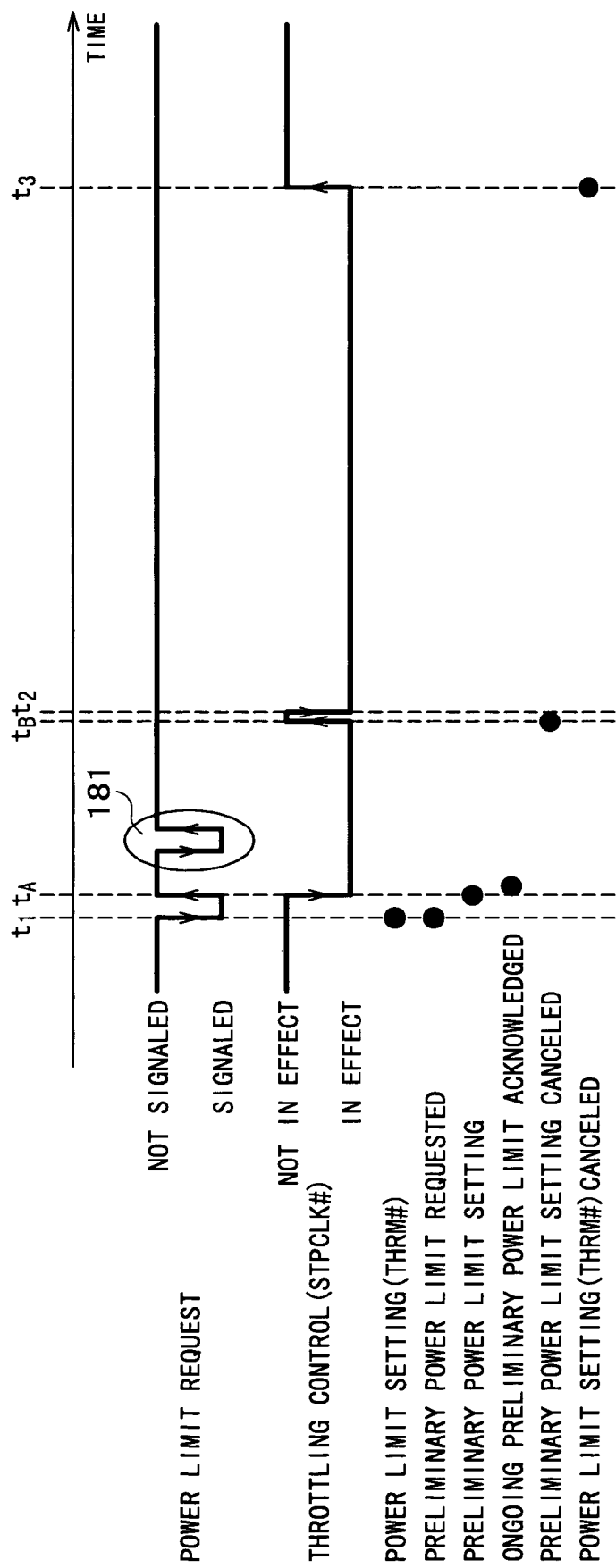
FIG. 15 is a timing chart applicable to the processing of the second case depicted in the arrow diagram of FIG. 14.

FIG. 14 is an arrow diagram depicting how the controller 40, AML 91, and south bridge 18 are related to one another during their processing in what is called the second case where the preliminary power limit control is performed but considered unsuccessful because power is not sufficiently limited. FIG. 15 is a timing chart applicable to the second case.

Figure 16:
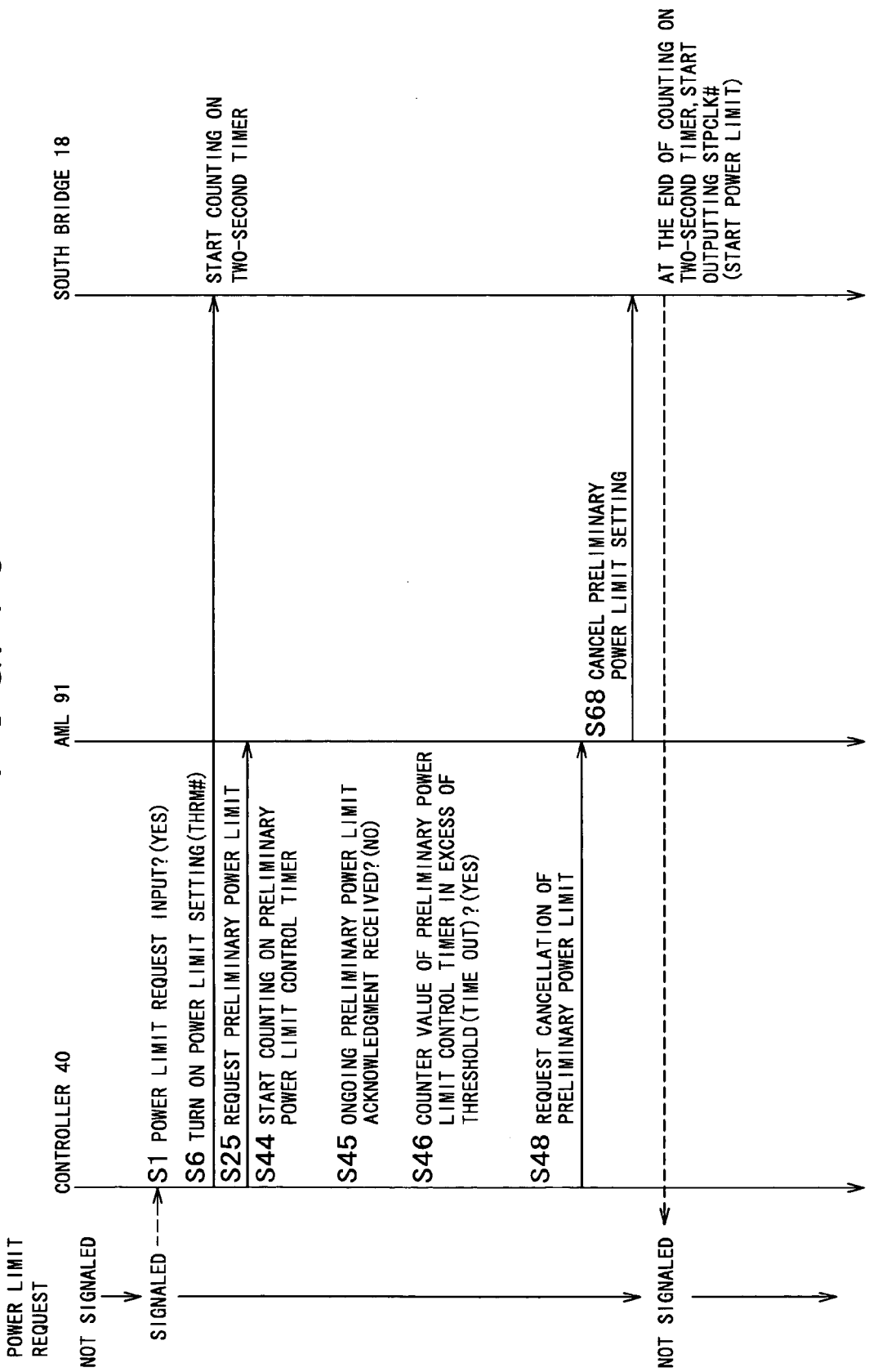
FIG. 16 is an arrow diagram presenting a third case of processing relations between the controller, AML (or BIOS), and the south bridge in the power limit control block of FIG. 2.
Figure 17:
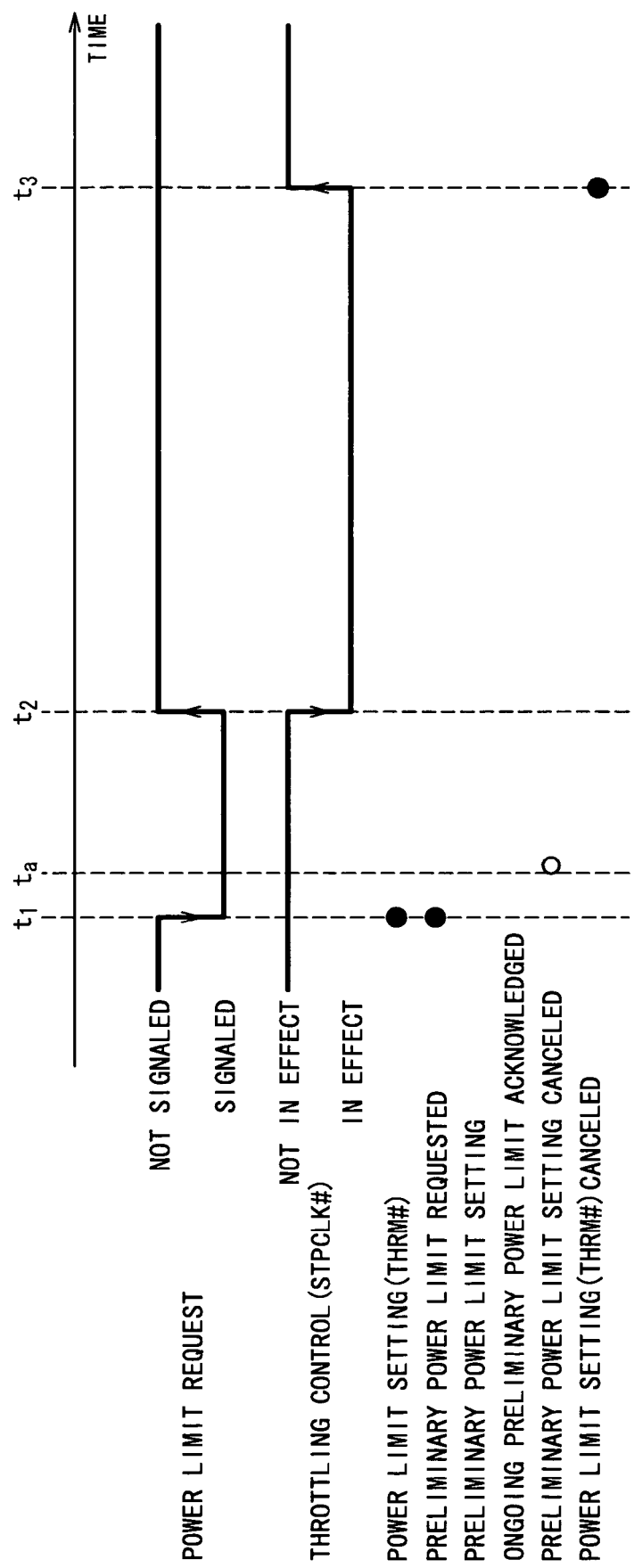
FIG. 17 is a timing chart applicable to the processing of the third case presented in the arrow diagram of FIG. 16.

FIG. 16 is an arrow diagram illustrating how the controller 40, AML 91, and south bridge 18 are related to one another during their processing in what is called the third case where the preliminary power limit control is not executed and is considered unsuccessful because of the absence of response from the AML 91. FIG. 17 is a timing chart applicable to the third case.

FIG. 18 is an arrow diagram indicating how the controller 40, AML 91, and south bridge 18 are related to one another during their processing in what is called the fourth case where the preliminary power limit control is executed but considered unsuccessful because of a delayed response from the AML 91. FIG. 19 is a timing chart applicable to the fourth case.

In the arrow diagrams of FIGS. 12, 14, 16 and 18, like reference characters designate like or corresponding steps in the flowcharts of FIGS. 8 through 11 discussed above.

It should be noted that not all steps of the flowcharts in FIGS. 8 through 11 are found in the arrow diagrams of FIGS. 12, 14, 16 and 18; only the major steps are included. Still, any steps or processes preceding or following each of these major steps are readily understood by referring to the flowchart of FIGS. 8 through 11.

In each of FIGS. 13, 15, 17 and 19, a time axis is shown at the top of the chart. This time axis is basically the same as that in FIG. 6 (FIG. 7). From the time axis down, the following are graphically illustrated: the presence or absence of a power limit request from the power monitoring unit 42; the execution or inexecution of the throttling control (the presence or absence of STPCLK# output by the STPCLK# generation unit 101); a power limit setting (THRM#) (the time at which the controller 40 writes "ON" to the register 103 via the signal line 71); a preliminary power limit request (the time at which the controller signals the request to the AML 91 using an SCI); a preliminary power limit setting (the time at which the AML 91 writes "ON" to the register 102 in these cases); an ongoing preliminary power limit acknowledgment (the time at which the AML 91 signals the acknowledgment to the controller 40); cancellation of the preliminary power limit setting (the time at which the AML 91 writes "OFF" to the register 102 in these cases); and cancellation of the power limit setting (THRM#) (the time at which the controller 40 writes "OFF" to the register 103 via the signal line 71).

How the power limit control block of FIG. 2 works in the first case above will now be described with reference to FIGS. 12 and 13.

Suppose that as shown in FIG. 13, a power limit request from the power monitoring unit 42 is turned on at the time t1.

In this case, the controller 40 determines at about the same time (at time t1) that the power limit request has been input (step S1 in FIG. 12), and sets the power limit setting (THRM#) to "ON" (step S6 in FIG. 12). That is, the controller 40 writes "ON" to the register 103 of the south bridge 18 through the signal line 71.

In turn, the timer 104 of the south bridge 18 starts counting. The count time of the timer 104 is set to two seconds in the case of the south bridge 18 from Intel Corporation as mentioned above. For that reason, the timer 104 is referred to as the two-second timer in FIG. 12. In the description that follows, the south bridge 18 is assumed to be one from Intel Corporation, and the timer 104 is called the two-second timer 104.

At about the time t1, the controller 40 signals a preliminary power limit request to the AML 91 using an SCI (step S25 in FIG. 12). The counting of the preliminary power limit control timer 112 is then started (step S44 in FIG. 12).

Usually (in the first case), the AML 91 sets the preliminary power limit at about the same time that the preliminary power limit request is signaled (at time tA in the example of FIG. 13). Since the throttling control is currently established as the preliminary power limit control, the AML 91 writes "ON" to the register 102 of the south bridge 18 through the ACPI layer 92.

Almost instantaneously, the register 102 outputs a generation command to the STPCLK# generation unit 101. Given the generation command, the STPCLK# generation unit 101 generates STPCLK# and outputs the generated signal to the throttling control unit 84 over the signal line 72. On detecting the signal STPCLK#, the throttling control unit 84 starts executing the throttling control. That is, the throttling control is carried out as the preliminary power limit control.

Once the preliminary power limit control is started, the power consumption of the system is usually kept lower than the power limit Pinplimit (FIG. 6). Thus the power limit request is turned off as shown in FIG. 13, and the request-absent continues from that point on.

At this time, the AML 91 waits for a predetermined time period to elapse (step S66 in FIG. 12). Upon elapse of the predetermined time period, the AML 91 signals an ongoing preliminary power limit acknowledgment (ACK) to the controller 40 (step S67 in FIG. 12).

Usually, the ongoing preliminary power limit acknowledgment (ACK) reaches the controller 40 before the count value of the preliminary power limit control timer 112 for the controller 40 exceeds the threshold value. On detecting the arrival of the ongoing preliminary power limit acknowledgment (ACK) ("YES" in step S45 of FIG. 12), the controller 40 starts monitoring the power limit request (step S50 in step S12).

When the preliminary power limit control timer 112 for the controller 40 finishes its counting operation ("YES" in step S51 of FIG. 12), the controller 40 determines whether or not a power limit request has been input from the time the monitoring of the power limit request was started (i.e., at the time indicated in FIG. 13 by a black circle representing the arrival of the acknowledgment) until the counting of the timer 112 has ended (at about time tB in FIG. 13).

During that time (in the first case above), as shown in FIG. 13, the power limit request remains off. The controller 40 thus determines that no power limit request has been input ("NO" in step S52 of FIG. 12), that the preliminary power limit control (throttling control in this case) executed so far has been successful, and that no further power limit control is necessary.

Based on that decision, the controller 40 sets the power limit setting (THRM#) to "OFF" (step S54 in FIG. 12). The controller 40 further signals a preliminary power limit cancel request to the AML 91 using an SCI (step S48 in FIG. 12).

At this point, the two-second timer 104 of the south bridge 18 stops its counting and performs initialization. That is, the power limit control (throttling control based on the power limit setting (THRM#)) is not carried out.

Meanwhile, upon receipt of the preliminary power limit cancel request, the AML 91 cancels the preliminary power limit setting (step S68 in FIG. 12). Since the throttling control is currently established as the preliminary power limit control, the AML 91 writes "OFF" to the register 102 of the south bridge 18.

Almost immediately, the register 102 stops outputting the generation command, and the STPCLK# generation unit 101 stops outputting STPCLK# correspondingly. On detecting the absence of the output signal STPCLK#, the throttling control unit 84 stops the throttling control that was in effect as the preliminary power limit control.

The preliminary power limit control and the power limit control (throttling control based on the power limit setting (THRM#)) are not allowed to be executed simultaneously as mentioned earlier. For that reason, the steps above need to be completed before the two-second timer 104 of the south bridge 18 ends its counting, (elapse of 2 seconds in this case) i.e., by the scheduled time at which the power limit control is to be started (by time t2 in FIG. 13). Therefore, in the example of FIG. 13, the preliminary power limit setting and the power limit setting (THRM#) are canceled at a time tB (e.g., the same time as the time tb in FIG. 7) before the time t2.

As described, if the shorter-time preliminary power limit control is executed before the start of the longer-time power limit control and if the preliminary power limit control is sufficient in limiting the power consumption of the system (information processing apparatus 1 of FIG. 1), then it is not mandatory to carry out the power limit control. This makes it possible to ease significantly the degradation in performance of the information processing apparatus under power management, as opposed to the case where only the throttling control (power limit control) is executed in accordance with the power limit setting (THRM#).

For example, if the south bridge 18 is one from Intel Corporation and if the duty rate is 10 percent, then it takes about 20 seconds to perform the throttling control (power limit control) based on the power limit setting (THRM#) (the 20-second period includes a delay time of 2 seconds before the start of the control). By contrast, the preliminary power limit control is carried out from the time the power consumption of the system exceeds the power limit until the power limit control is executed, i.e., within the delay time of the power limit control (within 2 seconds up to the start of the control). That means the power-limited time under the preliminary power limit control is one tenth or less of that under the power limit control. With the preliminary power limit control under execution according to this invention, the limiting level of power consumption need only be what is actually required.

How the power limit control block of FIG. 2 works in the second case above will now be described with reference to FIGS. 14 and 15.

Comparing FIG. 13 with FIG. 15 reveals major differences between the first and the second cases. In the first case (FIG. 13), the throttling control taking the form of the preliminary power limit control is successful and, with the power limit request turned off, the request-absent state continues from that point on. What takes place in the second case (FIG. 15) is the same as in the first case until the throttling control in the form of the preliminary power limit control is carried out. After that, however, the second case is characterized by a failure to fully limit the power consumption of the system (information processing apparatus 1 of FIG. 1) under the preliminary power limit control. As indicated by a state 181 in FIG. 15, the power limit request is turned on under the preliminary power limit control in the second case.

As described, the workings of the power limit control block in the second case are basically the same as those in the first case until the preliminary power limit control timer 112 of the controller 40 terminates the counting operation ("YES" in step S51 of FIG. 14). Below is a description of what is done in the second case by the power limit control block from that point on.

When the preliminary power limit control timer 112 of the controller 40 ends the counting ("YES" in step S51 of FIG. 14), the controller 40 determines whether or not a power limit request has been input from the time the monitoring of the power limit request was started (i.e., at the time indicated in FIG. 15 by a black circle representing the arrival of the ongoing preliminary power limit acknowledgment) until the counting of the timer 112 has ended (at about time tB in FIG. 15).

In the second case, the power limit request is turned on as indicated by the state 181 in FIG. 15. This leads the controller 40 to determine that the power limit request has been input ("YES" in step S52 of FIG. 14), that the preliminary power limit control executed so far (throttling control in this case) has failed, and that the power limit control needs to be carried out.

Unlike in the first case, the controller 40 does not cancel the power limit setting (THRM#) (i.e., no processing is done on the south bridge 18). Instead, the controller 40 only signals a preliminary power limit cancel request to the AML 91 using an SCI (step S48 in FIG. 14).

On receiving the preliminary power limit cancel request, the AML 91 cancels the preliminary power limit setting (step S68 in FIG. 12).

As in the first case, the STPCLK# generation unit 101 of the south bridge 18 stops outputting STPCLK# accordingly. The throttling control in the form of the preliminary power limit control is thus stopped.

However, the power limit setting (THRM#) has yet to be canceled (it remains on), so that the register 103 outputs a generation command to the STPCLK# generation unit 101 at the end of the counting operation by the two-second timer 104 (at time t2 in the example of FIG. 15). Given the generation command, the STPCLK# generation unit again generates STPCLK# and outputs the generated signal to the throttling control unit 84 over the signal line 72. On detecting the signal STPCLK#, the throttling control unit 84 again carries out the throttling control. This time, the throttling control is executed as the power limit control.

As described, the power limit control block of FIG. 2, given an insufficient result of the preliminary power limit control, performs the ensuing power limit control unfailingly. This makes it possible ultimately to keep the power consumption of the system (information processing apparatus 1 in FIG. 1) below the power limit in force.

Described below with reference to FIGS. 16 and 17 is how the power limit control block of FIG. 2 works in the third case.

In the third case, as shown in FIG. 17, the controller 40 signals a preliminary power limit request (SCI) to the AML 91 but the latter fails to respond.

Suppose that as in the first and the second cases, the power limit request from the power monitoring unit 42 is turned on illustratively at the time t1.

At about the same time (i.e., time t1), the controller 40 determines that the power limit request has been input (step S1 in FIG. 16) and sets the power limit setting (THRM#) to "ON" (step S6 in FIG. 16). This causes the two-second timer 104 of the south bridge 18 to start counting.

At about the time t1, the controller 40 signals a preliminary power limit request to the AML 91 using an SCI (step S25 in FIG. 16). This causes the preliminary power limit control timer 112 to start its counting operation (step S44 in FIG. 16).

The workings so far of the power limit control block are basically the same as those in the first and the second cases.

In the third case, however, the AML 91 fails to respond to the preliminary power limit request. That obviously means the AML 91 does not output an ongoing preliminary power limit acknowledgment (ACK).

As a result, the controller 40 does not detect continuously the arrival of an ongoing preliminary power limit acknowledgment (ACK) ("NO" in step S45 of FIG. 16). When the value on the counter of the preliminary power limit control timer 102 for the controller 40 exceeds the threshold ("YES" in step S46 of FIG. 16), i.e., when the time ta (the same as the time ta in FIG. 7) is reached in the example of FIG. 17, the controller 40 signals a preliminary power limit cancel request to the AML 91 using an SCI (step S48 in FIG. 16).

In the third case above, the AML 91 does not respond and the preliminary power limit setting remains off. This eliminates the need for the preliminary power limit cancel request to be signaled. Still, since the preliminary power limit control and the power limit control are not allowed to take place concurrently, the preliminary power limit cancel request is signaled for reasons of safety.

In the example of FIG. 17, the time at which the preliminary power limit setting is canceled is indicated by a hollow circle. The hollow, not solid black, circle means that although the preliminary power limit control remains set because of the absence of response from the AML 91, the preliminary power limit cancel request is being signaled.

In the third case, as described, the preliminary power limit control is not performed because the AML 91 does not respond.

When the two-second timer 104 of the south bridge 18 finishes its counting (at time t2 in the example of FIG. 17), the register 103 outputs a generation command to the STPCLK# generation unit 101. Given the generation command, the STPCLK# generation unit 101 generates STPCLK# and outputs the generated signal to the throttling control unit 84 via the signal line 72. On detecting the signal STPCLK#, the throttling control unit 84 starts the throttling control.

As described, even if the AML 91 does not respond thereby preventing the preliminary power limit control from getting executed, the power limit control block of FIG. 2 carries out the power limit control unfailingly. This makes it possible ultimately to keep the power consumption of the system (information processing apparatus 1 in FIG. 1) below the power limit in force.

Described below with reference to FIGS. 18 and 19 is how the power limit control block of FIG. 2 works in the fourth case.

In the fourth case, as shown in FIG. 19, the controller 40 signals a preliminary power limit request (SCI) to the AML 91 but the latter is slow in responding. This results in insufficient execution of the preliminary power limit control.

Suppose that as in the first through the third cases, the power limit request from the power monitoring unit 42 is turned on illustratively at the time t1.

At about the same time (i.e., at time t1), the controller 40 determines that the power limit request has been input (step S1 in FIG. 18) and sets the power limit setting (THRM#) to "ON" (step S6 in FIG. 18) accordingly. This causes the two-second timer 104 of the south bridge 18 to start counting.

At about the time t1, the controller 40 also signals a preliminary power limit request to the AML 91 using an SCI (step S25 in FIG. 18). This causes the preliminary power limit control timer 112 to start its counting operation (step S44 in FIG. 18).

The workings so far of the power limit control block are basically the same as those in the first through the third cases.

In the fourth case, however, the AML 91 is slow in responding. Illustratively, as indicated by a state 191 in FIG. 19, the AML 91 sets the preliminary power limit control immediately before the time ta (i.e., the point in time corresponding to the threshold for the preliminary power limit control timer 112) (step S65 in FIG. 18).

In that case, the south bridge 18 outputs STPCLK#. The throttling control unit 84 of the CPU 11 carries out the throttling control as the preliminary power limit control.

The AML 91 waits for a predetermined time period to elapse before outputting an ongoing preliminary power limit control acknowledgment (ACK) so as to execute the preliminary power limit control without fail. As a result, the acknowledgment (ACK) may be output but only past the time ta.

In this case, the ongoing preliminary power limit control acknowledgment (ACK) may or may not be output depending on the point in time at which the preliminary power limit cancel request is signaled, as will be discussed later. In FIG. 18, no process is shown executed with regard to the ongoing preliminary power limit acknowledgment. In FIG. 19, the ongoing preliminary power limit acknowledgment is indicated not by a solid black circle but by a hollow circle.

Thus from the viewpoint of the controller 40, the absence of the ongoing preliminary power limit acknowledgment is detected in precisely the same way as in the third case ("NO" in step S45 of FIG. 18). When the value on the counter of the preliminary power limit control timer 102 for the controller 40 exceeds the threshold ("YES" in step S46 of FIG. 18), i.e., when the time ta is reached in the example of FIG. 19, the controller 40 signals a preliminary power limit cancel request to the AML 91 using an SCI (step S48 in FIG. 18).

In the third case above, the AML 91 did not respond and the preliminary power limit setting remained off. Thus it was not mandatory for the preliminary power limit cancel request to be signaled. In the fourth case, however, it is mandatory to signal the preliminary power limit cancel request because the preliminary power limit control is underway. That is, without the ongoing preliminary power limit acknowledgment coming in, the preliminary power limit cancel request was shown to be signaled in the third case for reasons of safety. In the fourth case, the signaling of the preliminary power limit cancel request is mandatory in view of what takes place therein.

When the preliminary power limit cancel request is signaled, the AML 91 cancels the preliminary power limit setting (step S68 in FIG. 18). This causes the south bridge 18 to stop outputting STPCLK#, so that the preliminary power limit control (throttling control executed by the throttling control unit 84) is stopped as well.

When the two-second timer 104 finishes the counting operation in the south bridge 18 (at time t2 in the example of FIG. 19), the register 103 outputs a generation command to the STPCLK# generation unit 101. Given the generation command, the STPCLK# generation unit 101 generates STPCLK# and outputs the generated signal to the throttling control unit 84 via the signal line 72. On detecting the signal STPCLK#, the throttling control unit 84 starts the throttling control (power limit control) based on the power limit setting (THRM#).

As described, even if the AML 91 is slow in responding and the preliminary power limit control is performed insufficiently (i.e., interrupted halfway, with the power limit request turned on between the time ta and the time t2, as indicated by broken lines in FIG. 19), the power limit control block of FIG. 2 still carries out the ensuing power control limit unfailingly. This makes it possible ultimately to keep the power consumption of the system (information processing apparatus 1 in FIG. 1) below the power limit in force.

The four representative cases (the first through the fourth) of the workings of the power limit control block in FIG. 2 have been discussed so far.

Of these four cases, the first is characterized by the following developments: when the state transition condition 162 in the state transition diagram of FIG. 5 is fulfilled, the normal state 151 is replaced by the preliminary power limited state 152. After the subsequent success of the preliminary power limit control, the state transition condition 164 is satisfied, whereby the preliminary power limited state 152 is replaced by the normal state 151.

In the second through the fourth cases, by contrast, the normal state 151 is replaced by the preliminary power limited state 152 when the state transition condition 162 in the state transition diagram of FIG. 5 is fulfilled. After the subsequent failure of the preliminary power limit control, the state transition condition 165 is satisfied, whereby the preliminary power limited state 152 is replaced by the power limited state 153.

As described, the information processing apparatus according to this invention (e.g., information processing apparatus 1 in FIG. 1 having the power limit control block of FIG. 2) is arranged to monitor the actual power consumption of the apparatus as a whole. If the level of power consumption being monitored is found to exceed a predetermined threshold, a power limit request is output. The output of the power limit request puts the first and the second controls into effect for power management by limiting the availability factor of the CPU. The two kinds of control may be carried out concurrently; one of the two may be executed singly; or one may be performed first and subsequently taken over by the other.

In addition to the first and the second controls, the information processing apparatus of this invention may readily perform multistage power limit control. Thus the inventive apparatus offers the following eight major benefits:

(1) The implementation of multistage power limit control eases the degree of difficulty in designing the power supply unit for use with the apparatus.

(2) When this invention is practiced by referring to the foregoing description and the accompanying drawings, it is possible to design a system that consumes power (temporarily) at levels exceeding the sustainable capability of the power supply unit while maintaining logical consistency and averting quality defects. The inventive design reduces the size and weight of the power supply unit and thereby enhances the marketability of the unit.

(3) Where the conventional method of executing or not executing a single power limit control is in place, it is necessary to design the apparatus with the worst-case scenario in mind. That means large constraints need to be imposed even on those level of power consumption which barely exceed the threshold (e.g., power limit "Pinplimit" in FIG. 6). The result is degraded performance or worsened usability of the information processing apparatus. According to this invention, by contrast, three or more power limited states can be readily implemented with the information processing apparatus as shown in the state transition diagram of FIG. 5. In a situation where the power consumption of the apparatus slightly exceeds the threshold, a first level of power limit control appreciably lower than the worst design value is initially put into effect (e.g., transition is made to the preliminary power limited state 152 in the example of FIG. 5). If the first level of power limit control proves insufficient, then a second power limit based on the worst design value is imposed (e.g., transition is made to the power limited state 153 in FIG. 5). This measure circumvents the above-mentioned overkill problem of power control conventionally experienced.

(4) The first control is implemented as the hardware-driven power limit control (e.g., throttling control as per THRM#), and the second control as the software-driven preliminary power limit control (e.g., multistage voltage scaling control effected by AML (or by BIOS in the non-ASPI environment), control by TCC, or throttling control). This arrangement permits manufacturing the inventive information processing apparatus capable of using both the first and the second controls, at about the same cost as a conventional information processing apparatus utilizing the first control only.

(5) The software-driven preliminary power limit control (second control) is faster in response speed than the hardware-driven power limit control (first control). That means the inventive information processing apparatus executing both the first and the second controls is speedier in performing power management than the conventional apparatus employing the first control alone. When subject to lower power loads, the power supply unit needs to be switched off less often than before. In other words, the shutdown time of the information processing apparatus is minimized.

(6) On the other hand, the hardware-driven power limit control (first control) is more reliable than the software-driven preliminary power limit control (second control). It follows that the inventive information processing apparatus utilizing both the first and the second controls is more dependable than the conventional apparatus using only the second control. Specifically, even if the object of control is in an abnormal state (e.g., where the system (information processing apparatus) hangs up or is too busy), the information processing apparatus of this invention still carries out power management unfailingly.

(7) According to the invention, the throttling control is triggered by a signal from hardware (e.g., from the power monitoring unit 42 in FIG. 3). This arrangement eliminates the need for an OS, software applications or control tables and thereby makes it easier to transport the techniques of power management from one apparatus to another as well as to standardize the techniques.

(8) The inventive information processing apparatus need only have one threshold power limit value (e.g., threshold for use by the power monitoring unit 42 in FIG. 3). Compared with the conventional apparatus having a plurality of threshold values, the inventive apparatus with its single threshold can significantly reduce hardware cost, man-hours needed for design, and verification cost.

Where to detect the current needed for the power limit control of this invention is not limited to the power transmission line 131 in FIG. 3 carrying the current In subject to detection. Alternatively, the current may be detected on any other power transmission line, inside or outside the information processing apparatus 1, which carries a current relevant to the ups and downs of power consumption by the apparatus 1. For example, the current to be detected may be one passing through the CPU 11 or flowing over the USB bus 57.

In the preceding examples, the availability factor controlling function of the CPU was shown to be utilized for power management. Alternatively, any other processors such as DSPs (digital signal processors) or MPUs (micro processing units) may be controlled likewise as long as they have a corresponding availability factor controlling capability. The processor as understood in this specification is thus any hardware-based operation unit which is incorporated in the information processing apparatus and which appropriately carries out arithmetic or logical operations; any hardware-based control unit performing suitable control operations; or a hardware device that incorporates at least such an operation unit and a control unit.

Where the series of steps described above are to be executed by software, the programs constituting the processing sequences may be either loaded from dedicated hardware of a suitable computer into its internal memory for execution, or installed upon program execution from a suitable storage medium into a general-purpose personal computer or like equipment capable of executing diverse functions.

As shown in FIG. 1, the storage medium is offered to users apart from the personal computer not only as a package medium constituted by the magnetic disc 61 (including flexible discs), optical disc 62 (including CD-ROM (compact disc-read only memory) and DVD (digital versatile disc)), magneto-optical disc 63 (including MD (Mini-disc; registered trademark)), or semiconductor memory 64; but also in the form of the ROM or the hard disc drive 27, each containing the programs and incorporated beforehand in the computer.

In this specification, the steps which are stored on the storage medium and which describe the programs to be executed represent not only the processes that are carried out in the depicted sequence (i.e., on a time series basis) but also processes that may be conducted parallelly or individually.

As many apparently different embodiments of this invention may be made without departing from the spirit and scope thereof, it is to be understood that the invention is not limited to the specific embodiments thereof except as defined in the appended claims.

What is claimed is:

1. An information processing apparatus having a processor, comprising:
   power monitoring means for monitoring power consumed by said information processing apparatus, said power monitoring means further outputting a power limit request demanding a limit to said power when said power being monitored exceeds a predetermined threshold;
   first setting means for setting a first control for limiting an availability factor of said processor as a limit to said power when said power monitoring means outputs said power limit request;
   second setting means for setting a second control for limiting said availability factor of said processor as a limit to said power when said power monitoring means outputs said power limit request;
   first controlling means for executing said first control set by said first setting means; and
   second controlling means for executing said second control set by said second setting means.

2. An information processing apparatus according to claim 1, wherein said first controlling means executes said first control at the same time that said second controlling means executes said second control.

3. An information processing apparatus according to claim 1, wherein said first controlling means starts said first control at a first time of day upon elapse of a first time period following the setting of said first control by said first setting means; and
   wherein said second controlling means starts said second control at a second time of day which is earlier than said first time of day.

4. An information processing apparatus according to claim 3, wherein said second setting means sets cancellation of said second control by said second controlling means at a third time of day which is later than said second time of day and earlier than said first time of day; and
   wherein said second controlling means cancels said second control the moment said second setting means sets cancellation of said second control.

5. An information processing apparatus according to claim 4, wherein, if said power limit request is not output by said power monitoring means while said second control is being executed by said second controlling means, then said first setting means sets cancellation of said first control by said first controlling means at a point in time earlier than said first time of day; and if said power limit request is output by said power monitoring means, then said first setting means sets cancellation of said first control by said first controlling means at a fourth time of day upon elapse of a second time period following said first time of day; and
   wherein said first controlling means cancels said first control the moment said first setting means sets cancellation of said first control.

6. An information processing apparatus according to claim 5, wherein said second time period is set based on said first time period and on a duty rate specified for a power supply unit which supplies power to said information processing apparatus.

7. An information processing apparatus according to claim 6, wherein, if said power limit request is output by said power monitoring means, then said first setting means sets said first control for said first controlling means and outputs an execution request requesting said second setting means to execute said second control; and
   wherein said second setting means sets said second control for said second controlling means, assuming as said second time of day a point in time at which said execution request output by said first setting means is detected.

8. An information processing apparatus according to claim 7, wherein said first setting means outputs a cancellation request requesting said second setting means to cancel said second control at a predetermined point in time which is earlier than said first time of day; and
   wherein said second setting means sets cancellation of said second control for said second controlling means, assuming as said third time of day a point in time at which said cancellation request output by said first setting means is detected.

9. An information processing apparatus according to claim 8, wherein said second setting means sets said second control for said second controlling means, before outputting response information to said first setting means signaling the latter that said second control has been set.

10. An information processing apparatus according to claim 9, wherein, if said response information to be output by said second setting means is not detected, then said first setting means outputs said cancellation request to said second setting means, and sets cancellation of said first control for said first controlling means at said fourth time of day regardless of said power limit request being output or not output by said power monitoring means.

11. An information processing apparatus according to claim 1, wherein said first control denotes throttling control.

12. An information processing apparatus according to claim 1, wherein said second control denotes throttling control.

13. An information processing apparatus according to claim 1, wherein said second control denotes control by a thermal control circuit.

14. An information processing apparatus according to claim 1, wherein said second control denotes multistage voltage scaling control.

15. An information processing method for use with an information processing apparatus having a processor, said information processing method comprising the steps of:
   monitoring power consumed by said information processing apparatus, said power monitoring step further generating a power limit request demanding a limit to said power when said power being monitored exceeds a predetermined threshold;
   firstly setting a first control for limiting an availability factor of said processor as a limit to said power when said power monitoring step generates said power limit request;
   secondly setting a second control for limiting said availability factor of said processor as a limit to said power when said power monitoring step generates said power limit request;
   firstly controlling execution of said first control set in said first setting step; and
   secondly controlling execution of said second control set in said second setting step.

16. A program for use with an information processing apparatus which comprises:
   a processor;
   a power monitoring unit for monitoring power consumed by said information processing apparatus, said power monitoring unit further outputting a power limit request demanding a limit to said power when said power being monitored exceeds a predetermined threshold;
   a first controlling mechanism for executing a first control for limiting an availability factor of said processor as a limit to said power;
   a second controlling mechanism for executing a second control for limiting said availability factor of said processor as a limit to said power; and
   a microcomputer for passing data to and from said first controlling mechanism via a first interface implemented as hardware and to and from said second controlling mechanism via a second interface implemented as software;
   said program being executed by said microcomputer and comprising the steps of:
   firstly setting said first control for said first controlling mechanism via said first interface when said power monitoring unit outputs said power limit request; and
   secondly setting said second control for said second controlling mechanism via said second interface when said power monitoring unit outputs said power limit request.

17. A program according to claim 16, wherein said second interface is either an advanced configuration and power interface machine language or a basic input/output system;
   wherein said second setting step involves signaling an execution request to said advanced configuration and power interface machine language or to said basic input/output system using either a system control interrupt or a system management interrupt, said execution request requesting said second controlling mechanism to execute said second control; and
   wherein either said advanced configuration and power interface machine language or said basic input/output system sets said second control for said second controlling mechanism upon receipt of said execution request from said microcomputer.

* * * * *